US008970719B2

(12) United States Patent
Shirakawa et al.

(10) Patent No.: US 8,970,719 B2
(45) Date of Patent: Mar. 3, 2015

(54) IMAGE PROCESSING APPARATUS AND IMAGE PROCESSING METHOD

(75) Inventors: Ryuji Shirakawa, Fuchu (JP); Tetsuya Shioyama, Koganei (JP); Yusuke Machida, Yokohama (JP)

(73) Assignee: JVC Kenwood Corporation, Yokohama-shi, Kanagawa (JP)

(*) Notice: Subject to any disclaimer, the term of this patent is extended or adjusted under 35 U.S.C. 154(b) by 361 days.

(21) Appl. No.: 13/530,653

(22) Filed: Jun. 22, 2012

(65) Prior Publication Data
US 2012/0327270 A1 Dec. 27, 2012

(30) Foreign Application Priority Data

Jun. 23, 2011 (JP) ................ P2011-139688
Jun. 23, 2011 (JP) ................ P2011-139691

(51) Int. Cl.
H04N 5/235 (2006.01)
H04N 5/228 (2006.01)
H04N 5/262 (2006.01)
G03B 7/00 (2014.01)

(52) U.S. Cl.
CPC ............ H04N 5/2355 (2013.01); H04N 5/2356 (2013.01)
USPC ............... 348/221.1; 348/222.1; 348/239; 348/362

(58) Field of Classification Search
USPC ............... 348/221.1, 222.1, 239, 362, 364
See application file for complete search history.

(56) References Cited

U.S. PATENT DOCUMENTS

| 6,649,051 | B1* | 11/2003 | Jamalabadi et al. ....... 210/198.2 |
| 6,747,694 | B1 | 6/2004 | Nishikawa et al. |
| 2006/0177150 | A1 | 8/2006 | Uttendaele et al. |
| 2007/0296849 | A1 | 12/2007 | Sano et al. |
| 2009/0284625 | A1* | 11/2009 | Takemura et al. ............ 348/254 |
| 2010/0026823 | A1* | 2/2010 | Sawada ....................... 348/222.1 |
| 2010/0091119 | A1* | 4/2010 | Lee ............................. 348/208.4 |
| 2010/0259626 | A1* | 10/2010 | Savidge ..................... 348/208.4 |
| 2011/0169980 | A1* | 7/2011 | Cho et al. ................... 348/223.1 |
| 2011/0242368 | A1* | 10/2011 | Haneda et al. ............... 348/239 |

FOREIGN PATENT DOCUMENTS

| EP | 2237221 A1 | 10/2010 |
| JP | 2002-223350 A | 8/2002 |
| JP | 2010-273001 A | 12/2010 |

OTHER PUBLICATIONS

European Search Report issued on Oct. 2, 2012 in the counterpart European application No. 12004707.1.

* cited by examiner

*Primary Examiner* — James Hannett
*Assistant Examiner* — Tuan Le
(74) *Attorney, Agent, or Firm* — Nath, Goldberg & Meyer; Jerald L. Meyer

(57) ABSTRACT

Based on pixel value conversion coefficients, a pixel value converter converts pixel values of image signals obtained by imaging a same subject a plurality of times while mutually differentiating an exposure value. A synthesizing/weighting coefficient creation unit creates a synthesizing/weighting coefficient. A difference creation unit creates short-time exposure image data and long-time exposure image data. A weighting/synthesizing unit synthesizes the short-time exposure image data and the long-time exposure image data by using the synthesizing/weighting coefficient. A controller evaluates the difference, and updates the pixel value conversion coefficient so that the difference becomes smaller.

16 Claims, 17 Drawing Sheets

IMAGE PROCESSING APPARATUS AND IMAGE PROCESSING METHOD

CROSS REFERENCE TO RELATED APPLICATION

This invention is based upon and claims the benefit of priority under 35 U.S.C. §119 to Japanese Patent Applications No. P2011-139688, filed on Jun. 23, 2011 and No. P2011-139691, filed on Jun. 23, 2011, the entire contents of which are incorporated herein by reference.

BACKGROUND OF THE INVENTION

The present invention relates to an image processing apparatus and an image processing method, which synthesize images of a plurality of frames different in exposure value and create a synthetic image in which a dynamic range is expanded.

While the human sense of sight has an extremely wide dynamic range, a dynamic range of an imaging device such as a video camera is narrow. Therefore, in the case of simultaneously imaging a main subject such as a person and a background, then sometimes, the main subject and the background are imaged in a different state from appearances thereof such that the main subject is imaged so as to be dark and that the background is imaged so as to be subjected to over exposure. Accordingly, a technology has been known, which is for expanding a dynamic range of an image by imaging the same subject plural times under different conditions where an exposure value is differentiated, and by synthesizing such images of a plurality of frames.

In the case of synthesizing the images of the plurality of frames and creating such an image with a wide dynamic range, it is necessary to match pixel values of the respective images as synthesis targets based on an exposure value ratio at an imaging time. However, in actual imaging, it is necessary to image the images in a set exposure value ratio, and the pixel values become discontinuous at boundary portions where the images of the plurality of frames are switched in the case where the images concerned are synthesized. Technologies for reducing such discontinuity of the pixel values at the boundary portions are described in Japanese Patent Laid-Open Publication No. 2002-223350 (Patent Literature 1) and Japanese Patent Laid-Open Publication No. 2010-273001 (Patent Literature 2).

SUMMARY OF THE INVENTION

In each of Patent Literatures 1 and 2, in the event of synthesizing the plurality of images, the matching of the pixel values of the respective images as the synthesis targets is achieved by using a histogram of the images. If an arithmetic operation with high accuracy is attempted to be performed by using processing such as the histogram, in which an arithmetic operation amount is large, then a circuit scale is increased. Such an increase of the circuit scale brings a cost increase. In the case of synthesizing moving pictures in the video camera that images the moving pictures, since a state of the subject is changed every second, a high-speed arithmetic operation element becomes necessary if the pixel values are attempted to be matched at the boundary portions in quick response to the change of the subject. If the processing with the large arithmetic operation amount is attempted to be performed at a high speed, then it is difficult to avoid the increase of the circuit scale and the cost increase.

In consideration of the problems as described above, it is an object of the present invention to provide an image processing apparatus and an image processing method, which are capable of continuing the pixel values at the boundary portions in the event of synthesizing the images of the plurality of frames without increasing the circuit scale and the arithmetic operation amount to a large extent, and are capable of creating a visually natural image with a wide dynamic range.

In order to solve the foregoing problems of the conventional technology, a first aspect of the present invention provides an image processing apparatus comprising: a pixel value converter configured to receive a first plurality of image signals obtained by imaging a same subject a plurality of times while mutually differentiating an exposure value, to convert a pixel value of at least one image signal of the first plurality of image signals based on a pixel value conversion coefficient so that a pixel value difference in the first plurality of image signals owing to a fact that there is a difference in the exposure value be matched, and to output the first plurality of image signals as a second plurality of image signals; a synthesizing/weighting coefficient creation unit configured to create a synthesizing/weighting coefficient for use in an event of synthesizing the second plural image signals while taking, as a boundary portion, a region including a pixel with a predetermined pixel value; a difference creation unit configured to create a difference between the second plurality of image signals; a weighting/synthesizing unit configured to weight and synthesize the second plurality of image signals by using the synthesizing/weighting coefficient and to create a synthetic image signal; and a parameter update unit configured to evaluate the difference created by the difference creation unit, and to update the pixel value conversion coefficient so that the difference becomes smaller.

A second aspect of the present invention provides an image processing method comprising: imaging a same subject a plurality of times while mutually differentiating an exposure value, and creating a first plurality of image signals; converting a pixel value of at least one image signal of the first plurality of image signals based on a pixel value conversion coefficient so that a pixel value difference in the first plurality of image signals owing to a fact that there is a difference in the exposure value be matched, and creating a second plurality of image signals; creating a synthesizing/weighting coefficient for use in an event of synthesizing the second plurality of image signals while taking, as a boundary portion, a region including a pixel with a predetermined pixel value; creating a difference between the second plurality of image signals; weighting and synthesizing the second plurality of image signals by using the synthesizing/weighting coefficient, and creating a synthetic image signal; and evaluating the difference, and updating the pixel value conversion coefficient so that the difference becomes smaller.

DESCRIPTION OF THE EMBODIMENTS

A description is made of each of embodiments of an image processing apparatus and image processing method of the present invention with reference to the accompanying drawings. Each of the embodiments shows an example where the image processing apparatus is mounted on a video camera.

First Embodiment

Figure 1:
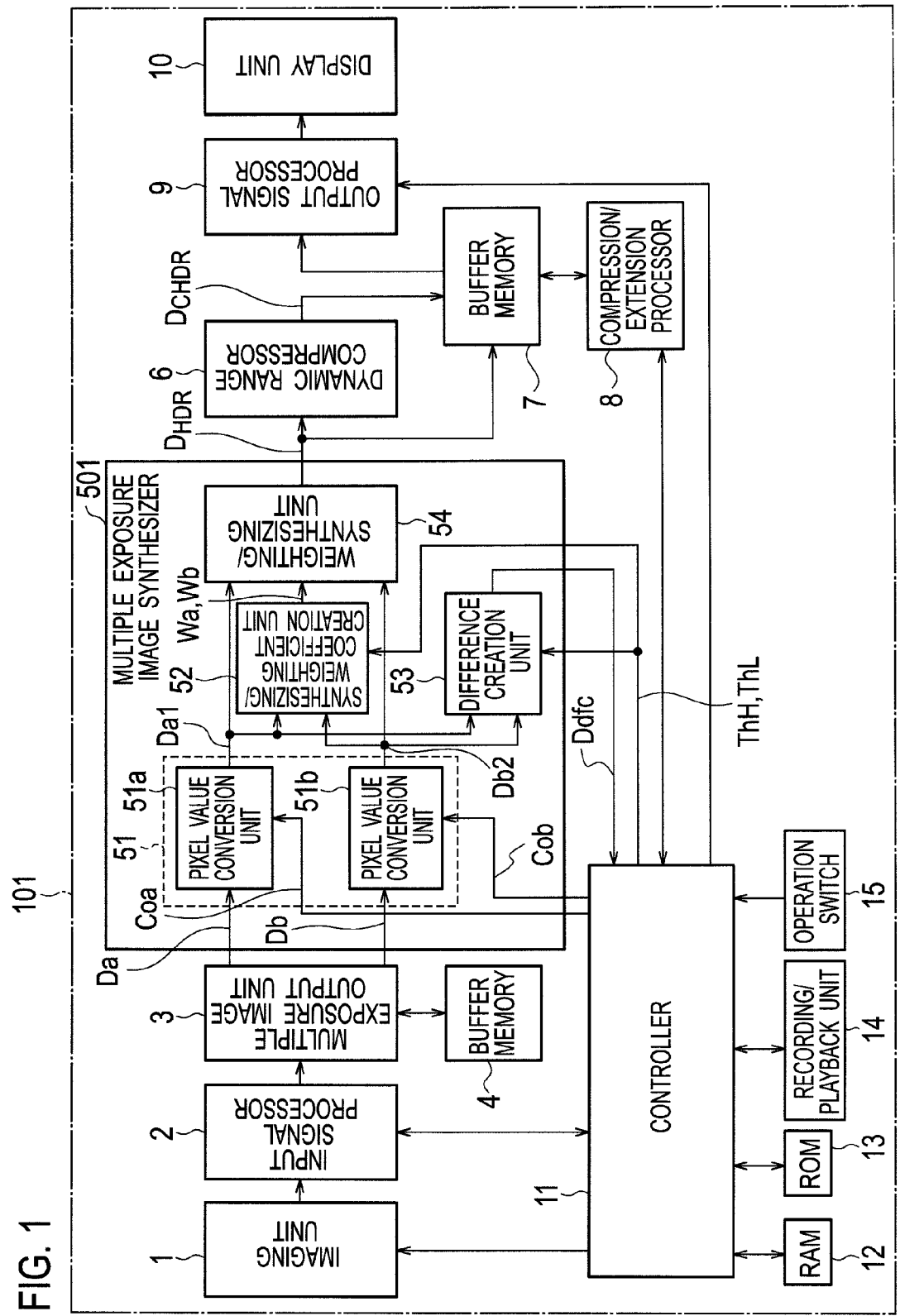
FIG. 1 is a block diagram showing first, second and fourth embodiments.

In FIG. 1, a video camera 101 includes: an imaging unit 1; an input signal processor 2; a multiple exposure image output unit 3; a buffer memory 4; a multiple exposure image synthesizer 501; a dynamic range compressor 6; a buffer memory 7; a compression/extension processor 8; an output signal processor 9; a display unit 10; a controller 11; a RAM 12; a ROM 13; a recording/playback unit 14; and an operation switch 15. The multiple exposure image synthesizer 501 includes: a pixel value converter 51; a synthesizing/weighting coefficient creation unit 52; a difference creation unit 53; a weighting/synthesizing unit 54. The pixel value converter 51 includes pixel value conversion units 51a and 51b.

The imaging unit 1 includes: an optical system having a lens, a diaphragm and the like; an imaging element such as a CCD and a CMOS; a control mechanism for exposure and focus; and the like. The imaging unit 1 takes out optical information, which is inputted to the imaging element through the lens, as an electrical signal at predetermined timing, and supplies the electrical signal to the input signal processor 2. In order to create an image with a wider dynamic range than a dynamic range of the imaging element, based on control by the controller 11, the imaging unit 1 performs so-called multiple exposure of imaging the same subject a plurality of times under different imaging conditions. In the first embodiment, as the different imaging conditions, the subject is imaged while differentiating an exposure value.

In order to differentiate the exposure value, it is sufficient if an exposure time is differentiated by adjusting a shutter speed, if a diaphragm value is adjusted, or if both of them are combined with each other. In the first embodiment, two images are imaged, which are: an image by short-time exposure in which the shutter speed is made fast; and an image by long-time exposure in which the shutter speed is made slow, and then both of the images are synthesized. Note that, preferably, the image is imaged while fixing the shutter speed in matching with a frame rate in the event of the imaging by the long-time exposure, and the image is imaged while controlling the exposure so that a high-brightness portion of such a short-time exposure image cannot be saturated to a large extent.

The imaging unit 1 supplies the input signal processor 2 with an electrical signal of the short-time exposure image and an electrical signal of the long-time exposure image in an arbitrary order. The input signal processor 2 performs A/D conversion for the electrical signals inputted thereto, converts the electrical signals into three RGB primary color signals, implements therefor a variety of signal processing such as white balance adjustment, gain adjustment and gamma processing, and converts the RGB primary color signals into brightness signals Y and color difference signals Cb and Cr. The brightness signal Y and color difference signals Cb and Cr of the short-time exposure image and the brightness signal Y and color difference signals Cb and Cr of the long-time exposure image are sequentially inputted to the multiple exposure image output unit 3. If such RGB signals are converted into the brightness signals Y and the color difference signals Cb and Cr, then a data volume is reduced, and accordingly, a necessary memory capacity can be reduced. In this event, bands of the color difference signals Cb and Cr are limited and time-axis multiplexed, whereby the data volume can be further reduced.

The multiple exposure image output unit 3 delays the brightness signals Y and the color difference signals Cb and Cr, which are previously inputted, by one vertical scan period by using the buffer memory 4. Then, at the same timing, the multiple exposure image output unit 3 supplies the brightness signal Y and color difference signals Cb and Cr of the short-time exposure image (hereinafter, referred to as short-time exposure image data Da) and the brightness signal Y and color difference signals Cb and Cr of the long-time exposure image (hereinafter, referred to as long-time exposure image data Db) to the multiple exposure image synthesizer 501. In this event, preferably, reading start addresses of data from the buffer memory 4 are controlled by using motion vectors, whereby screen shakes of the short-time exposure image data Da and the long-time exposure image data Db are corrected.

The short-time exposure image data Da is inputted to the pixel value conversion unit 51a, and the long-time exposure image data Db is inputted to the pixel data conversion unit 51b. For the pixel value conversion unit 51a, a pixel value conversion coefficient Coa is set by the controller 11, and for the pixel value conversion unit 51b, a pixel value conversion coefficient cob is set by the controller 11. Each of the pixel value conversion coefficients Coa and Cob is one of parameters for use in the event of image synthesis. Hereinafter, the pixel value conversion coefficients Coa and Cob are abbreviated as conversion coefficients Coa and Cob, respectively.

As will be described later, the conversion coefficients Coa and Cob are going to be changed from temporarily set conversion coefficients to sequentially corrected conversion coefficients. One of the conversion coefficients Coa and Cob may be set as a fixed conversion coefficient, and other thereof may be changed to the sequentially corrected conversion coefficient. In the first embodiment, the conversion coefficient Coa for the short-time exposure image data Da is fixed, and the conversion coefficient Cob for the long-time exposure image data Db is sequentially changed.

It is assumed that the short-time exposure image data Da and the long-time exposure image data Db is, for example, 10-bit digital data. Based on the conversion coefficient Coa, the pixel value conversion unit 51a multiplies, by 64, the 10-bit short-time exposure image data Da inputted thereto, and converts the exposure image data Da into 16-bit digital data. In the first embodiment, the exposure is controlled so that the high-brightness portion of the short-time exposure image cannot be saturated to a large extent, and accordingly, a fixed gain value is set as the conversion coefficient Coa so as to normalize a pixel value of the short-time exposure image data Da to a full dynamic range after the image synthesis.

Figure 2:
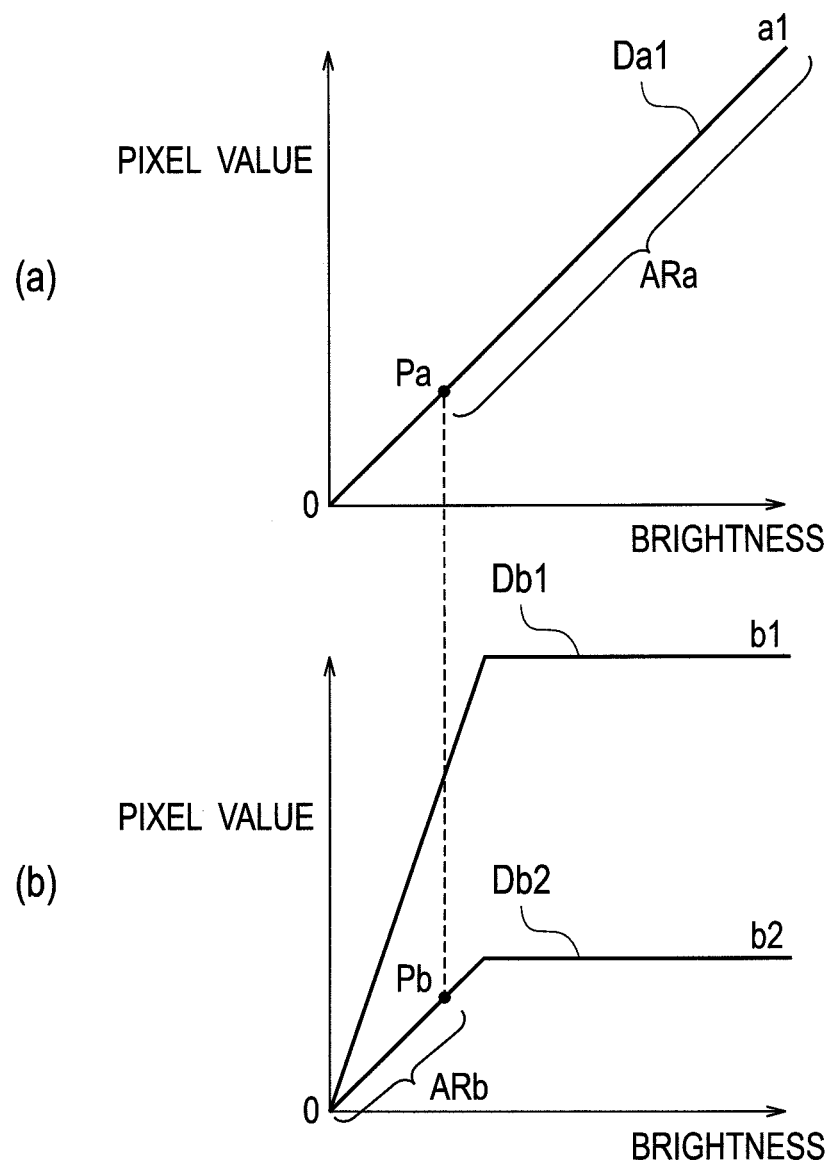
FIG. 2 is a diagram for explaining operations of a pixel value converter 51 in FIG. 1, FIG. 9, FIG. 11, FIG. 13, FIG. 15 and FIG. 17.

In FIG. 2, (a) shows characteristics a1 of short-time exposure image data Da1 after the conversion to 16 bits. Here, an axis of abscissas indicates brightness of the subject, and an axis of ordinates indicates a pixel value (brightness value).

First, the pixel value conversion unit 51b converts the 10-bit long-time exposure image data Db, which is inputted thereto, into 16-bit digital data. In FIG. 2, (b) shows characteristics b1 of long-time exposure image data Db1 after the conversion to 16 bits.

As shown in (b) of FIG. 2, the characteristics b1 of the long-time exposure image data Db1 are characteristics in which a pixel value is saturated at predetermined brightness or more. Next, in order to allow a slope of a non-saturation region of the characteristics b1 to coincide with a slope of characteristics a1, and to match pixel values thereof with each other, the pixel value conversion unit 51b converts the pixel value of the characteristics b1 in response to an exposure value ratio between the short-time exposure image data Da (Da1) and the long-time exposure image data Db (Db1), and then obtains long-time exposure image data Db2 of characteristics b2. If an exposure value of the long-time exposure image data Db is n times the exposure value of the short-time exposure image data Da, then the pixel value of the characteristics b1 just needs to be reduced to 1/n time the same.

The reason why the pixel value of the long-time exposure image data Db1 is converted in response to the exposure value ratio is in order to map the long-time exposure image data db2 on a region of the short-time exposure image data Da1 normalized as described above. The conversion coefficient Cob for the long-time exposure image data Db is a conversion coefficient for converting the pixel value in response to a ratio of such conversion of the number of bits and to the exposure value ratio.

It is not essential that the pixel value conversion units 51a and 51b convert the short-time exposure image data Da and the long-time exposure image data Db from 10 bits to 16 bits. The pixel value conversion units 51a and 51b just need to convert the pixel values in response to the exposure value ratio so that the slopes of the characteristics of the pixel values for the brightness of the subject can be allowed to coincide with each other and the pixel values of both thereof can be matched with each other while taking, as a reference, at least one of the short-time exposure image data Da and the long-time exposure image data Db.

In (a) and (b) of FIG. 2, while omitting gamma correction, the characteristics a1 are indicated by a straight line, and the characteristics b1 and b2 are indicated by polygonal lines of straight lines; however, in actual, the short-time exposure image data Da and the long-time exposure image data Db, which are to be inputted to the pixel value conversion units 51a and 51b, are subjected to the gamma correction. Accordingly, the controller 11 obtains a variation of the pixel value by standard gamma conversion for each of the short-time exposure image data Da and the long-time exposure image data Db. Based on the obtained variation, the controller 11 sets a temporal correction value, adds the temporal correction value to the conversion coefficient Cob having the exposure value ratio taken as a gain, and corrects the conversion coefficient Cob.

Figure 3:
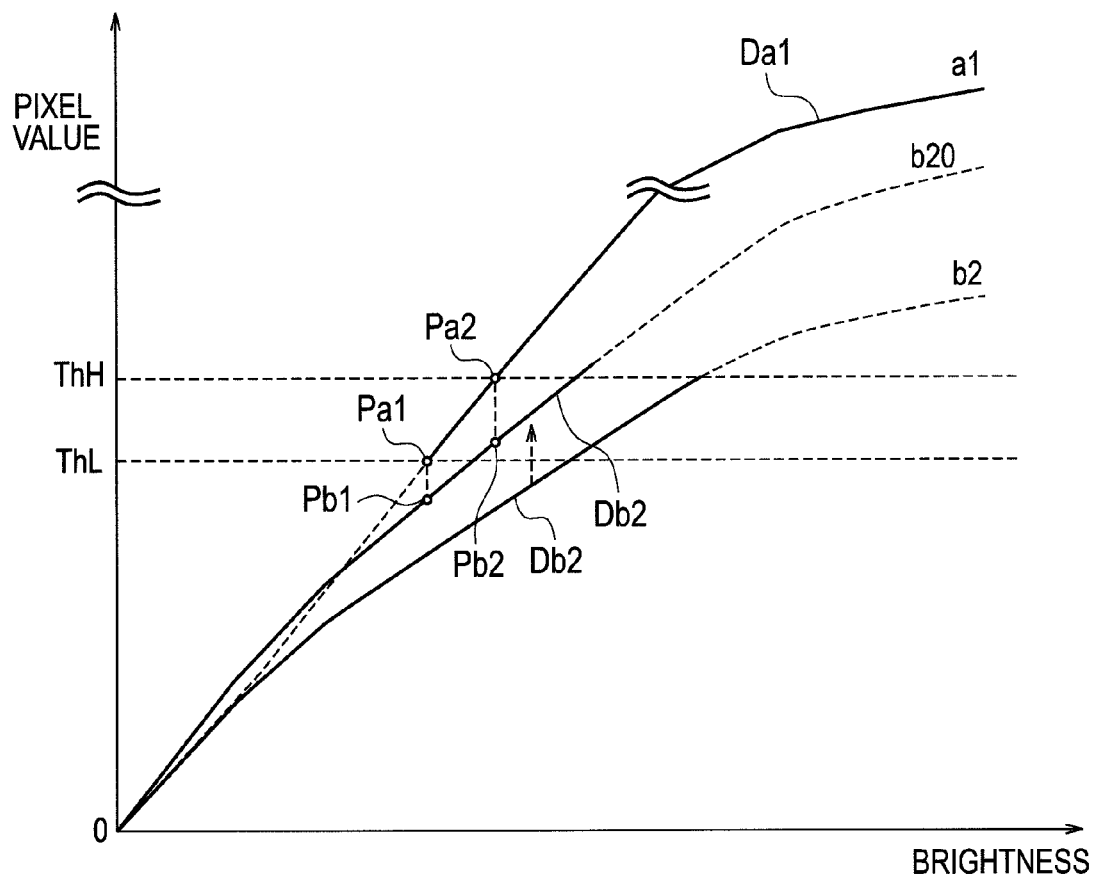
FIG. 3 is a diagram for explaining operations of multiple exposure image synthesizers 501, 503, 506 and 507 in FIG. 1, FIG. 9, FIG. 15 and FIG. 17.

By using FIG. 3, a description is made of the correction of the conversion coefficient Cob, which takes the gamma correction into consideration. FIG. 3 enlargingly shows the vicinities of points Pa and Pb as boundary portions of the synthesis in (a) and (b) of FIG. 2. In FIG. 3, the characteristics a1 and b2 in a state where the short-time exposure image data Da and the long-time exposure image data Db are subjected to the gamma correction are shown. The characteristics b2 are characteristics of the long-time exposure image data Db2 in which the pixel value is converted by the conversion coefficient Cob of a state where the correction value is not added thereto.

The controller 11 sets an upper limit value ThH on a high brightness side and a lower limit value ThL on a low brightness side as a range where the boundary portions in the event of synthesizing the short-time exposure image data Da1 and the long-time exposure image data Db2 are provided. The boundary portions form a region including pixels with a plurality of pixel values in which the upper limit value ThH is taken as a maximum pixel value and the lower limit value ThL is taken as a minimum pixel value.

In (a) and (b) of FIG. 2, for the sake of convenience, the short-time exposure image data Da1 and the long-time exposure image data Db2 are shown so as to be synthesized at the points Pa and Pb; however, the short-time exposure image data Da1 and the long-time exposure image data Db2 are synthesized in, as a synthesis region, such a boundary portion between the upper limit value ThH and the lower limit value ThL. Each of the upper limit value ThH and the lower limit value ThL is one of the parameters for use in the event of image synthesis.

As an example, as initial temporal setting, for the pixel value in such a saturation region of the characteristics b2, ¾ thereof is set at the upper limit value ThH, and ½ thereof is set at the lower limit value ThL. Strictly speaking, the pixel value in the saturation region is not a constant value; however, the setting just needs to be made as appropriate. A range that can be taken by data as the long-time exposure image data Db2 can be calculated by a ratio between the conversion coefficients Coa and Cob set in the pixel value conversion units 51a and 51b, and the pixel values in the saturation region can also be calculated. Hence, the controller 11 can set the upper limit value ThH and the lower limit value ThL individually at appropriate pixel values. As will be described later, the upper limit value ThH and the lower limit value ThL are corrected so as to sequentially narrow the synthesis region.

In the first embodiment, the conversion coefficient Cob is corrected so that the long-time exposure image data Db2 indicated by the characteristics b2 can be turned to characteristics b20 brought close to a center pixel value between the upper limit value ThH and the lower limit value ThL. Note that, though a correction amount for correction to the center pixel value differs depending on the brightness of the subject, which is indicated on the axis of abscissas of FIG. 3, the correction amount just needs to be set at such an average value as to be shifted to the center pixel value.

In the pixel value conversion units 51a and 51b, sometimes, one of the short-time exposure image data Da and the long-time exposure image data Db is offset, and the pixel values are converted. In the case of imaging the same subject three times or more under different imaging conditions and synthesizing imaged images, then sometimes, it is difficult to match the pixel values only by changing the gain. In this case, preferably, the offset of the pixel value is used in combination.

The multiple exposure image synthesizer 501 synthesizes the short-time exposure image data Da1 and the long-time exposure image data Db2, in which the pixel values are converted as described above. Conceptually, the multiple exposure image synthesizer 501 synthesizes a region ARb from a pixel value 0 to a predetermined pixel value at the point Pb in the characteristics b2 of the long-time exposure image data Db2 shown in (b) of FIG. 2 and a region ARa equal to or more than the pixel value of the point Pa in the characteristics a1 of the short-time exposure image data Da1 shown in (a) of FIG. 2.

The region Arb corresponds to a solid line portion of the characteristics b20 in FIG. 3, and the region ARa corresponds to a solid line portion of the characteristics a1. The multiple exposure image synthesizer 501 continues the pixel values at the boundary portions by allowing the pixel value at the point Pa and the pixel value at the point Pb to coincide with each other as much as possible by operations to be described later.

The short-time exposure image data Da1 and the long-time exposure image data Db2, which are obtained by converting the pixel values outputted from the pixel value conversion units 51a and 51b, are inputted to the synthesizing/weighting coefficient creation unit 52, the difference creation unit 53 and the weighting/synthesizing unit 54. The synthesizing/weighting coefficient creation unit 52 creates synthesizing/weighting coefficients for use in the event of synthesizing the short-time exposure image data Da1 and the long-time exposure image data Db2. The synthesizing/weighting coefficient for the short-time exposure image data Da1 is defined as a synthesizing/weighting coefficient Wa, and the synthesizing/weighting coefficient for the long-time exposure image data Db2 is defined as a synthesizing/weighting coefficient Wb. Each of the synthesizing/weighting coefficients Wa and Wb is one of the parameters for use in the event of the image synthesis.

To the synthesizing/weighting coefficient creation unit 52, the upper limit value ThH and the lower limit value ThL are inputted from the controller 11. While taking, as a reference, one of the short-time exposure image data Da1 and the long-time exposure image data Db2, the synthesizing/weighting coefficient creation unit 52 creates the synthesizing/weighting coefficient Wa and the synthesizing/weighting coefficient Wb. First, a description is made of the case where the long-time exposure image data Db2 is taken as a reference. Positions of the pixels in the frame in the long-time exposure image data Db2 are defined as (i, j), and pixel values at the individual positions (i, j) are defined as Yb(i, j). The pixel values here are brightness values. The synthesizing/weighting coefficients Wb and Wa at the positions (i, j) of the individual pixels can be represented by the next Expressions (1) and (2):

$$Wb(i,j) = \begin{cases} 1 & \text{where } Yb(i,j) < ThL \\ \dfrac{ThH - Yb(i,j)}{ThH - ThL} & \text{where } ThL \leq Yb(i,j) \leq ThH \\ 0 & \text{where } ThH < Yb(i,j) \end{cases} \quad (1)$$

$$Wa(i,j) = 1 - Wb(i,j) \quad (2)$$

In the case where the short-time exposure image data Da1 is taken as a reference, then in a similar way, positions of the pixels in the frame in the short-time exposure image data Da1 defined as (i, j), and pixels values (brightness values) at the individual positions (i, j) are defined as Ya(i, j). The synthesizing/weighting coefficient Wa and the synthesizing/weighting coefficient Wb at the positions (i, j) of the individual pixels can be represented by the next Expressions (3) and (4). An image signal taken as a reference may be either of the long-time exposure image data Db2 and the short-time exposure image data Da1. That is to say, the synthesizing/weighting coefficients Wa and Wb may be obtained by Expressions (1) and (2), or may be obtained by Expressions (3) and (4):

$$Wa(i,j) = \begin{cases} 0 & \text{where } Ya(i,j) < ThL \\ \dfrac{Ya(i,j) - ThL}{ThH - ThL} & \text{where } ThL \leq Ya(i,j) \leq ThH \\ 1 & \text{where } ThH < Ya(i,j) \end{cases} \quad (3)$$

$$Wb(i,j) = 1 - Wa(i,j) \quad (4)$$

The synthesizing/weighting coefficients Wa and Wb obtained as described above are inputted to the weighting/synthesizing unit 54.

The difference creation unit 53 creates a difference value between the brightness signals Y of the short-time exposure image data Da1 and the long-time exposure image data Db2, which are inputted thereto. For the difference value, the controller 11 sets a positive threshold value and a negative threshold value. The difference creation unit 53 counts difference values which exceed either of the positive threshold value and the negative threshold value, and then creates a difference count value Ddfc.

By using FIG. 3, a description is made of a difference creation operation in the difference creation unit 53. While taking, as a reference, either of the short-time exposure image data Da1 and the long-time exposure image data Db2, the difference creation unit 53 obtains a difference between both of them. In this event, preferably, the difference is obtained within a range between the upper limit value ThH and the lower limit value ThL, which are inputted thereto from the controller 11. In the case where the short-time exposure image data Da1 is taken as a reference, then as shown in FIG. 3, the difference creation unit 53 obtains a difference thereof for each position of the pixel in the frame from the long-time exposure image data Db2, which is indicated by the characteristics b20, within a range from a pixel value (brightness value) of a point Pa1, which corresponds to the lower limit value ThL of the short-time exposure image data Da1 indicated by the characteristics a1, to a pixel value (brightness value) of a point Pa2, which corresponds to the upper limit value ThH thereof.

The difference creation unit 53 subtracts, from the pixel value of the point Pa1, a pixel value of the point Pb1 of the long-time exposure image data Db2, which is a position of the pixel in the frame, the position corresponding to the point Pa1, thereby obtaining a difference value. The above is a description of an example in the case where the pixel value of the long-time exposure image data Db2 at the corresponding pixel position is Pb1. In a similar way, the difference creation unit 53 subtracts, from the pixel value of the point Pa2, a pixel value of the point Pb2 of the long-time exposure image data Db2, which is a position of the pixel in the frame, the position corresponding to the point Pa2, thereby obtaining a difference value. The above is a description of an example where the pixel value of the long-time exposure image data Db2 at the corresponding pixel position is Pb2.

Though not shown in FIG. 3, the difference creation unit 53 obtains the difference value also for each of pixels located between the point Pa1 and the point Pa2. Based on the difference values thus obtained, the difference creation unit 53 creates the difference count value Ddfc exceeding both of the positive threshold value and the negative threshold value.

The reason why the difference count value Ddfc is created in the synthesis region between the upper limit value ThH and the lower limit value ThL is in order to determine whether or not the conversion coefficient Cob is appropriate, which is added with the correction value temporarily set based on the variation of the pixel value by the standard gamma conversion as described above. The matter that the difference count value Ddfc is large indicates that, in the synthesis region, the short-time exposure image data Da1 indicated by the characteristics a1 and the long-time exposure image data Db2 indicated by the characteristics b20 deviate from each other. In this case, it is necessary to further correct the conversion coefficient Cob.

The difference creation unit 53 creates the difference values and obtains the difference count value Ddfc only in the synthesis region between the upper limit value ThH and the lower limit value ThL, whereby errors on the outside of the synthesis region are excluded, and the difference in the synthesis region can be obtained accurately. Moreover, since differences in unnecessary portions are not obtained, the calculation is simplified, and it also becomes possible to reduce the data volume.

The difference count value Ddfc created by the difference creation unit 53 is inputted to the controller 11. In an example of determining whether or not the difference between the short-time exposure image data Da1 and the long-time exposure image data Db2 is large, the controller 11 uses the difference count value Ddfc obtained as described above. If the difference count value Ddfc is large, then the short-time exposure image data Da1 and the long-time exposure image data Db2 deviate from each other.

In response to the difference count value Ddfc, the controller 11 corrects the conversion coefficient Cob to be supplied to the pixel value conversion unit 51b. As a result of correcting the conversion coefficient Cob, in the case where the conversion coefficient Cob is changed in a direction where the count value is reduced, then, in order that an interval between the upper limit value ThH and the lower limit value ThL can be narrowed, the controller 11 updates the upper limit value ThH and the lower limit value ThL so that both of them can be approximated to each other. When the upper limit value ThH and the lower limit value ThL are updated, the synthesizing/weighting coefficients Wa and Wb to be created in the synthesizing/weighting coefficient creation unit 52 are updated. The controller 11 operates as a parameter update unit that updates the respective parameters, which are the conversion coefficient Cob, the upper limit value ThH and the lower limit value ThL, and the synthesizing/weighting coefficients Wa and Wb.

Figure 4:
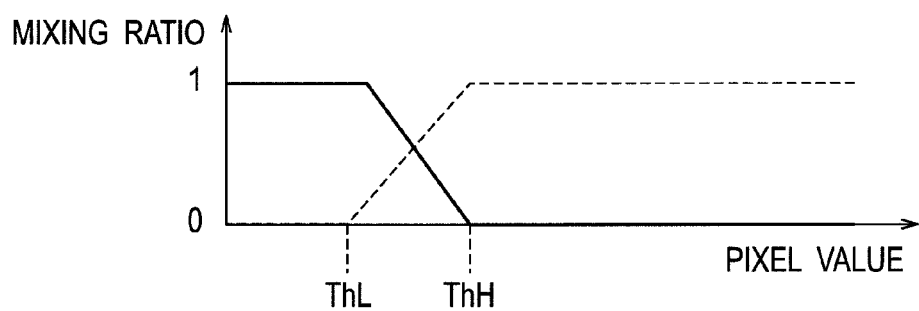
FIG. 4 is a diagram for explaining a weighting/synthesizing operation in a weighting/synthesizing unit 54 in FIG. 1, FIG. 9, FIG. 11, FIG. 13, FIG. 15 and FIG. 17.

The weighting/synthesizing unit 54 performs weighting and synthesis for the short-time exposure image data Da1 and the long-time exposure image data Db2, which are supplied from the pixel value conversion units 51a and 51b, by using the synthesizing/weighting coefficients Wa and Wb. FIG. 4 conceptually shows the weighting and the synthesis in the weighting/synthesizing unit 54. Here, an axis of abscissas indicates a pixel value, and an axis of ordinates indicates a mixing ratio. That is to say, FIG. 4 shows the case where the synthesizing/weighting coefficients Wa and Wb are created by Expressions (1) and (2). 1 in the mixing ratio is equivalent to 100%, which indicates that only one of the short-time exposure image data Da1 and the long-time exposure image data Db2 is used.

As shown in FIG. 4, from 0 to the lower limit value ThL in the pixel value, the weighting/synthesizing unit 54 sets the data for use at only the long-time exposure image data Db2 (solid line), and from the lower limit value ThL to the upper limit value ThH in the pixel value, the weighting/synthesizing unit 54 mixes the short-time exposure image data Da1 and the long-time exposure image data Db2 so that the short-time exposure image data Da1 (broken line) can be sequentially increased from 0 to 1 while the long-time exposure image data Db2 can be sequentially reduced from 1 to 0. When the pixel value exceeds the upper limit value ThH, the weighting/synthesizing unit 54 sets the data for use at only the short-time exposure image data Da1. Note that the expressions which Yb(i, j) in Expressions (1) and (3) use when the pixel value is from ThL or more to ThH or less represent slopes in the event of crossfading the short-time exposure image data Da1 and the long-time exposure image data Db2 in FIG. 4.

Note that, for each of the brightness signal Y and the color difference signals Cb and Cr, the weighting/synthesizing unit 54 performs the weighting and the synthesis for the short-time exposure image data Da1 and the long-time exposure image data Db2 by using the synthesizing/weighting coefficients Wa and Wb. The synthesizing/weighting coefficients Wa and Wb created based on the brightness signal Y just need to be also used for synthesis for the color difference signals Cb and Cr.

The controller 11 repeats, in the unit of the frame of the synthesis image, the above-described operations of correcting the conversion coefficient Cob by the difference count value Ddfc evaluated in the previous frame, updating the upper limit value ThH and the lower limit value ThL, and updating the synthesizing/weighting coefficients Wa and Wb. Then, the conversion coefficient Cob is sequentially optimized, the pixel values of the short-time exposure image data Da1 and the long-time exposure image data Db2 are sequentially approximated to each other in the synthesis region between the upper limit value ThH and the lower limit value ThL. In addition, the synthesis region is sequentially narrowed, and accordingly, the short-time exposure image data Da1 and the long-time exposure image data Db2 are mixed in an extremely narrow range as a center portion between the upper limit value ThH and the lower limit value ThL. In such a way, in the synthesis image, the pixel values at the boundary portions continue with each other, and a natural image with a wide dynamic range is obtained.

Returning to FIG. 1, a wide dynamic range image data $D_{HDR}$ outputted from the weighting/synthesizing unit 54 is inputted to the dynamic range compressor 6. The dynamic range compressor 6 compresses the dynamic range of the wide dynamic range image data $D_{HDR}$ in order to convert the wide dynamic range image data $D_{HDR}$ into image data that can be handled in a usual image processing circuit. In the first embodiment, the dynamic range compressor 6 compresses the dynamic range of the wide dynamic range image data $D_{HDR}$ by tone correction that is based on the Retinex theory, and creates compressed wide dynamic range image data $D_{CHDR}$.

The buffer memory 7 is a memory that temporarily holds the wide dynamic range image data $D_{HDR}$ or the compressed wide dynamic range image data $D_{CHDR}$. The compression/extension processor 8 performs compression processing for the compressed wide dynamic range image data $D_{CHDR}$, which is held in the buffer memory 7, in accordance with a compression method such as JPEG and MPEG, thereby creating encoded data. The encoded data is recorded in the recording/playback unit 14 by the controller 11. Moreover, the compression/extension processor 8 performs extension processing for the encoded data in the case where the controller 11 reads out the encoded data recorded in the recording playback unit 14.

The output signal processor 9 converts the compressed wide dynamic range image data $D_{CHDR}$ into a format in which it is possible to display the compressed wide dynamic range image data $D_{CHDR}$ on the display unit 10, and then inputs the compressed wide dynamic range image data $D_{CHDR}$ thus converted to the display unit 10. Moreover, in order to supply the compressed wide dynamic range image data $D_{CHDR}$ to an external instrument such as a display device (not shown), the output signal processing unit 9 converts the compressed wide dynamic range image data $D_{CHDR}$ in matching with a format and size of the external instrument. As an example, the output signal processing unit 9 converts the compressed wide dynamic range image data $D_{CHDR}$ into an NTSC signal.

The controller 11 controls the whole of the video camera 101. The controller 11 can be composed of a CPU. As described above, the controller 11 creates the conversion coefficients Coa and Cob, supplies the created conversion coefficients Coa and Cob to the pixel value conversion units 51a and 51b, creates the upper limit value ThH and the lower limit value ThL, and supplies the upper limit value ThH and the lower limit value ThL, which are thus created, to the synthesizing/weighting coefficient creation unit 52 and the difference creation unit 53. The controller 11 also creates or sets other various parameters necessary for such image synthesis processing. Moreover, the controller 11 creates character data to be superimposed on image data to be displayed on the display unit 10 and on image data to be outputted to the outside, and supplies the created character data to the output signal processor 9.

To the controller 11, the RAM 12 as a working memory of the controller 11 is connected. In the ROM 13, a program for operating the controller 11 is stored. The controller 11 controls the video camera 101 based on the program stored in the ROM 13. The recording/playback unit 14 is an arbitrary recording medium such as a hard disk drive and a semiconductor memory, and recording and playback thereof are controlled by the controller 11. The operation switch 15 is connected to the controller 11, and an operation signal by the operation switch 15 is inputted to the controller 11. The operation switch 15 may be a remote controller.

The image processing apparatus of the first embodiment may be composed of hardware, or may be composed of software (computer program). The image processing apparatus may be composed by mixing the hardware and the software.

Figure 5:
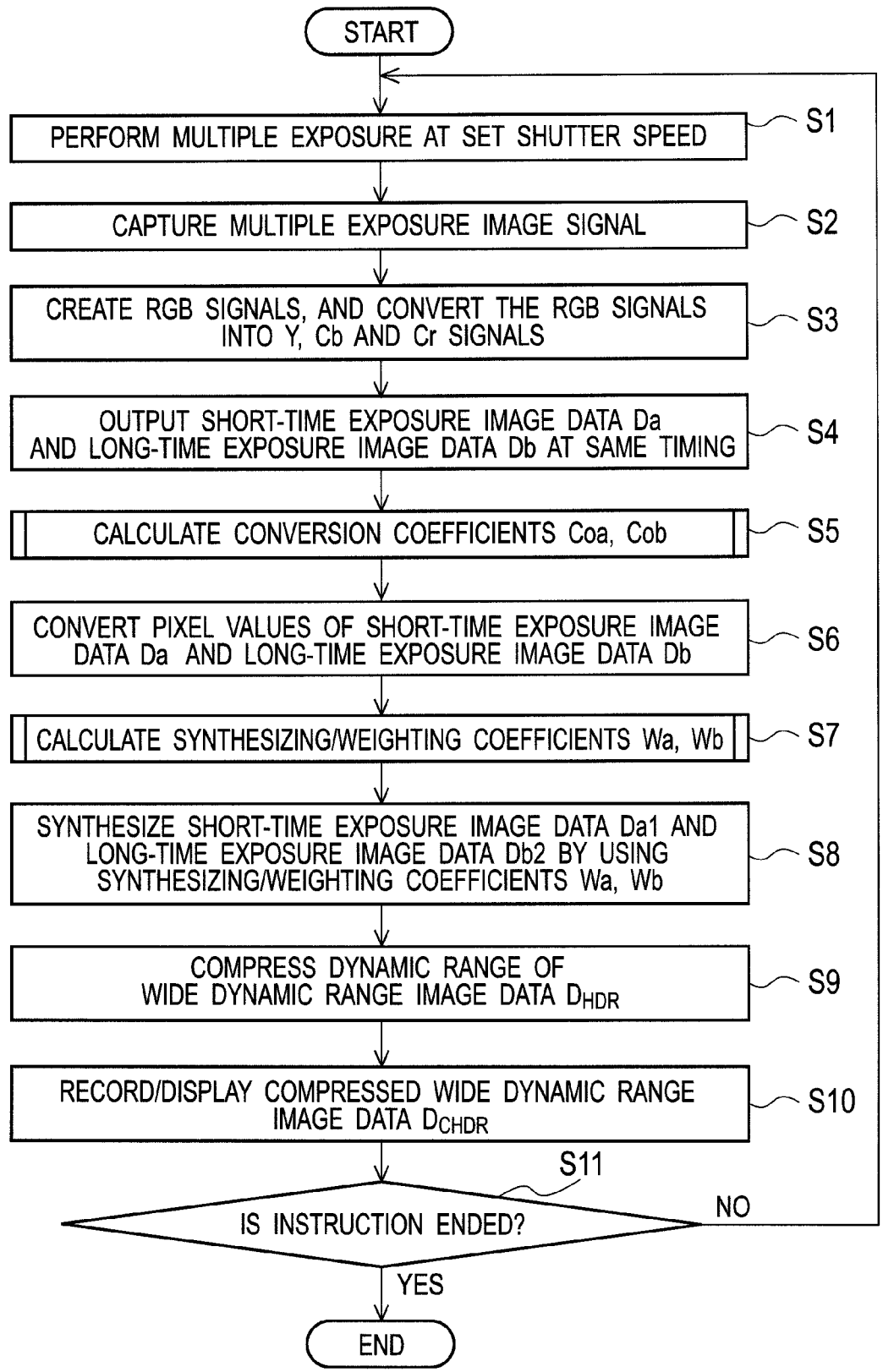
FIG. 5 is a flowchart showing an overall operation of each of embodiments.
Figure 6:
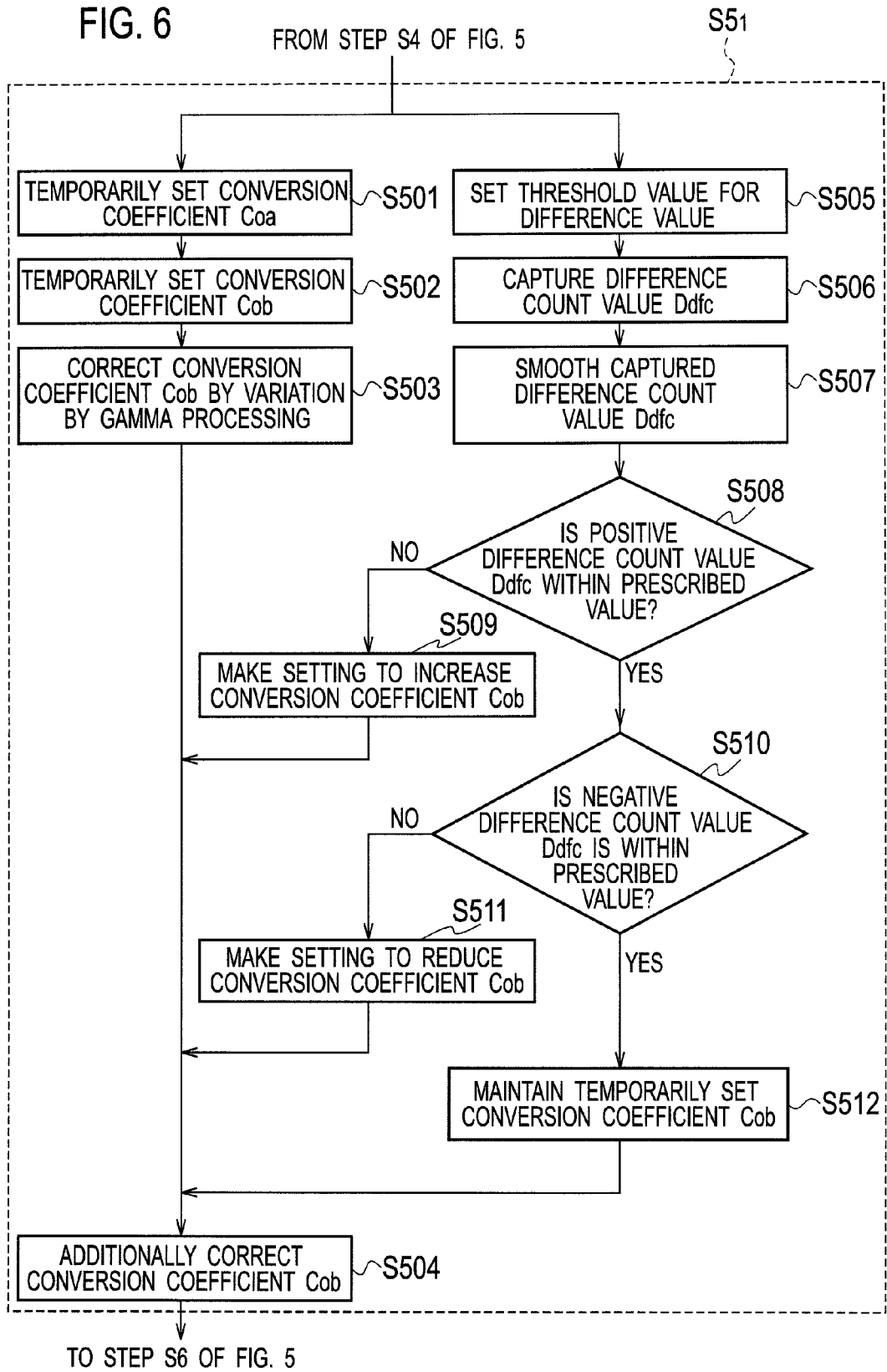
FIG. 6 is a flowchart of Step S5 in FIG. 5, showing specific processing of Step $S5_1$ according to a first embodiment.
Figure 7:
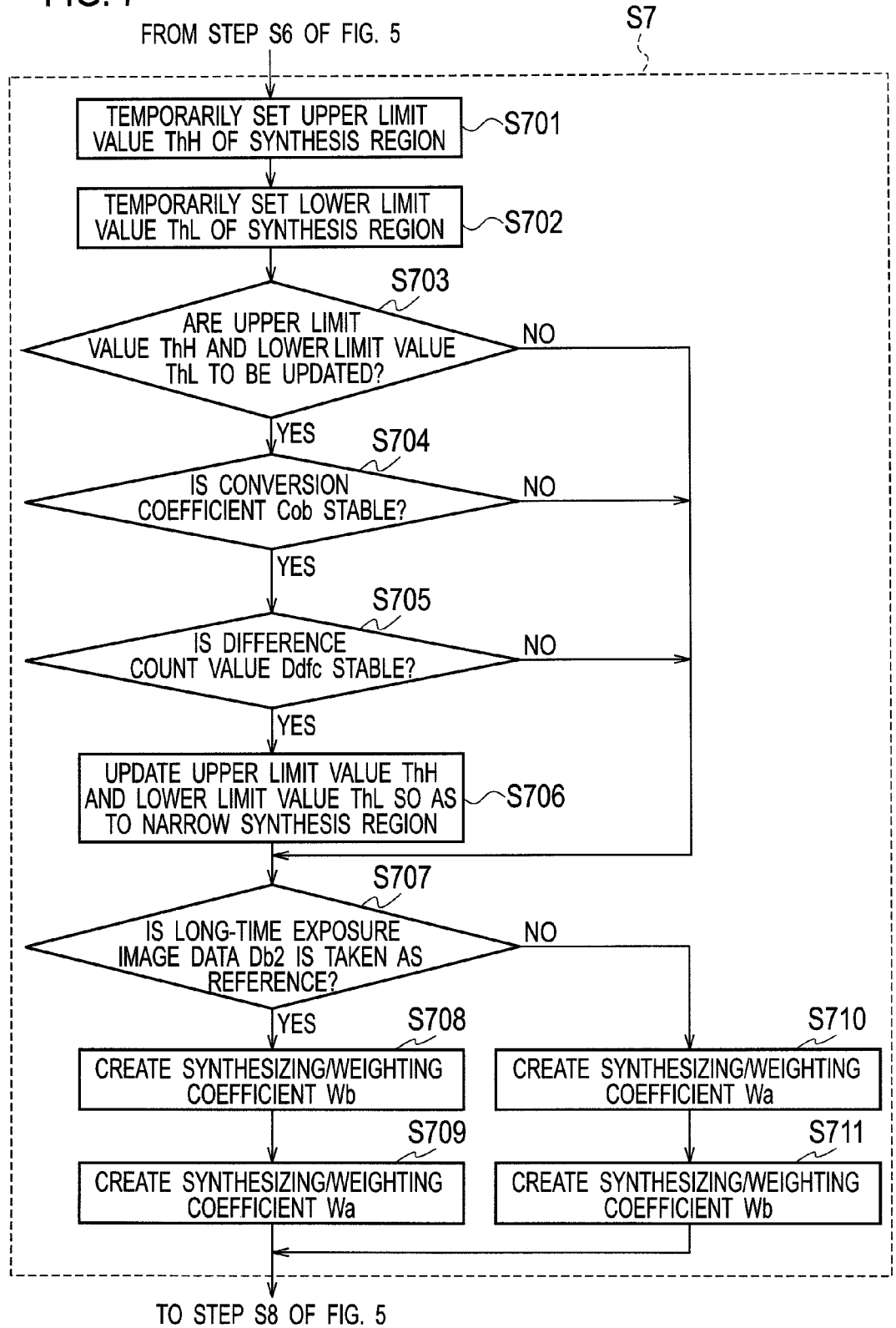
FIG. 7 is a flowchart showing specific processing of Step S7 in FIG. 5.

By using flowcharts shown in FIG. 5 to FIG. 7, a description is further made of such image processing operations to be executed in the video camera 101. FIG. 5 shows the whole of the image processing operations to be executed in the first embodiment and second to seventh embodiments to be described later. In FIG. 5, in Step S1, the imaging unit 1 performs the multiple exposure for the same subject at a set shutter speed. In Step S2, the input signal processor 2 captures a multiple exposure image signal. In Step S3, the input signal processor 2 creates RGB signals, and converts the created RGB signals into Y, Cb and Cr signals. In Step S4, the multiple exposure image output unit 3 outputs the short-time exposure image data Da and the long-time exposure image data Db at the same timing. In Step S5, the controller 11 calculates the conversion coefficients Coa and Cob. Specific processing of Step S5 will be described later.

In Step S6, the pixel value conversion units 51a and 51b convert the pixel values of the short-time exposure image data Da and the long-time exposure image data Db based on the conversion coefficients Coa and Cob. In Step S7, the synthesizing/weighting coefficient creation unit 52 calculates the synthesizing/weighting coefficients Wa and Wb for synthesizing the short-time exposure image data Da1 and the long-time exposure image data Db2, in which the pixel values are converted. Specific processing of Step S7 will be described later. In Step S8, the weighting/synthesizing unit 54 weights and synthesizes the short-time exposure image data Da1 and the long-time exposure image data Db2 by using the synthesizing/weighting coefficients Wa and Wb.

In Step S9, the dynamic range compressor 6 compresses the dynamic range of the wide dynamic range image data $D_{HDR}$. In Step S10, the controller 11 compresses the compressed wide dynamic range image data $D_{CHDR}$, then records the compressed wide dynamic range image data $D_{CHDR}$ in the recording/playback unit 14 after encoding the same, and displays the compressed wide dynamic range image data $D_{CHDR}$ on the display unit 10. In Step S11, the control unit 11 determines whether or not such an instruction for the image synthesis is ended. Whether or not to synthesize the images subjected to the multiple exposure can be switched by the operation of the operation switch 15. If it is determined that the instruction for the image synthesis is not ended, then the processing returns to Step S1, and if it is determined that instruction concerned is ended, then the operations of the synthesis processing are ended.

By using FIG. 6, a description is made in detail of calculation processing for the conversion coefficients in Step S5 of FIG. 5. Step S5 to be executed in the first embodiment will be referred to as Step $S5_1$. In FIG. 6, in Step S501, the controller 11 temporarily sets the conversion coefficient Coa for the short-time exposure image data Da. As mentioned above, the conversion coefficient Coa may be the fixed gain value for converting the 10-bit short-time exposure image data Da into the 16-bit digital data. Although the conversion coefficient Coa is defined to be temporarily set, the conversion coefficient Coa is not updated in the first embodiment. In Step S502, the controller 11 temporarily sets the conversion coefficient Cob for the long-time exposure image data Db. As mentioned above, the conversion coefficient Cob is a coefficient for converting the 10-bit long-time exposure image data Db into the 16-bit digital data, and further, converting the pixel value in response to the exposure value ratio.

In Step S503, the controller 11 corrects the conversion coefficient Cob by an amount of a gain variation caused by the gamma processing. The correction here is temporal correction that is based on the variation of the pixel value by the standard gamma conversion for each of the short-time exposure image data Da and the long-time exposure image data Db. In Step S504, the controller 11 additionally corrects the conversion coefficient Cob based on evaluation results of such a difference value Ddf between the short-time exposure image data Da1 and the long-time exposure image data Db2 in Steps S509 and S511.

In Step S505, the controller 11 sets the positive threshold value and the negative threshold value for the difference value created by the difference creation unit 53. In Step S506, the controller 11 captures the difference count value Ddfc created by the created by the difference creation unit 53. In order to exclude a sudden change of the difference value Ddf owing to noise and the like, the controller 11 smoothes the difference count value Ddfc in Step S507. In FIG. 1 and FIG. 6, the difference count value is generically referred to as the difference count value Ddfc; however, for the sake of convenience here, a difference count value Ddfc that exceeds the positive threshold value will be referred to as a difference count value Ddfc (+), and a difference count value Ddfc that exceeds the negative threshold value will be referred to as a difference count value Ddfc (−).

In Step S508, the controller 11 determines whether or not the difference count value Ddfc (+) that exceeds the positive threshold value is within a prescribed value for evaluation, which is preset in the control unit 11. If it is not determined that the difference count value Ddfc (+) is within the prescribed value (NO), that is, in the case where the difference count value Ddfc (+) exceeds the prescribed value, then in Step S509, the controller 11 make a setting to increase the conversion coefficient Cob, and shifts the processing to Step S504.

If it is determined that the difference count value Ddfc (+) is within the prescribed value (YES), then in Step S510, the controller 11 determines whether or not the difference count value Ddfc (−) that exceeds the negative threshold value is within a prescribed value for evaluation, which is preset in the controller 11. If it is not determined that the difference count value Ddfc (−) is within the prescribed value (NO), that is, in the case where the difference count value Ddfc (−) exceeds the prescribed value, then in Step S511, the controller 11 makes a setting to reduce the conversion coefficient Cob, and shifts the processing to Step S504.

If it is determined that the difference count value Ddfc (−) is within the prescribed value (YES), then in Step S512, the controller 11 maintains the temporarily set conversion coefficient Cob, and shifts the processing to Step S504.

Next, by using FIG. 7, a description is made in detail of calculation processing for the synthesizing/weighting coefficients Wa and Wb in Step S7 of FIG. 5. In FIG. 7, in Step S701, the control unit 11 temporarily sets the upper limit value ThH of the synthesis region described with reference to FIG. 3. In Step S702, the controller 11 temporarily sets the lower limit value ThL of the synthesis region described with reference to FIG. 3. In Step S703, the controller 11 determines whether or not to update the upper limit value ThH and the lower limit value ThL based on whether or not the difference count value Ddfc described with reference to FIG. 6 is within the prescribed value. If it is determined that the upper limit value ThH and the lower limit value ThL are to be updated (YES), then in Step S704, the controller 11 determines whether or not the conversion coefficient Cob is less changed and is stable. If it is not determined that the upper limit value ThH and the lower limit value ThL are to be updated (NO), the controller 11 shifts the processing to Step S707.

If is determined in Step S704 that the conversion coefficient Cob is stable (YES), then in Step S705, the control unit 11 determines whether or not the difference count value Ddfc (difference count values Ddfc (+) and Ddfc (−)) is less changed and is stable. If it is not determined that the difference count value Ddfc is stable (NO), then the control unit 11 shifts the processing to Step S707.

If it is determined in Step S705 that the difference count value Ddfc is stable (YES), then in Step S706, the control unit 11 updates the upper limit value ThH and the lower limit value ThL so as to narrow the synthesis region. If it is not determined that the difference count value Ddfc is stable (NO), then the controller 11 shifts the processing to Step S707.

Subsequently, in Step S707, the controller 11 determines whether or not the long-time exposure image data Db2 is taken as a reference. If it is determined that the long-time exposure image data Db2 is taken as a reference (YES), then in Step S708, the controller 11 creates the synthesizing/weighting coefficient Wb for the long-time exposure image data Db2, and in Step S709, creates the synthesizing/weighting coefficient Wa for the short-time exposure image data Da1. If it is not determined that the long-time exposure image data Db2 is taken as a reference (NO), then in Step S710, the controller 11 creates the synthesizing/weighting coefficient Wa, and in Step S711, creates the synthesizing/weighting coefficient Wb.

As described above, in the first embodiment, Steps S1 to S7 of FIG. 5 are repeated, whereby the conversion coefficient Cob and the synthesizing/weighting coefficients Wa and Wb converge onto a preferable state. As a result, with regard to the wide dynamic range image data $D_{HDR}$ to be outputted by the weighting/synthesizing unit 54 in Step S8 of FIG. 5, the pixel values at the boundary portions continue with each other, and a visually natural image is obtained.

As understood from the above description, in the first embodiment, the difference count value Ddfc that is based on the difference value between the short-time exposure image data Da1 and the long-time exposure image data Db2 just needs to be obtained, and the conversion coefficient Cob and the synthesizing/weighting coefficients Wa and Wb just need to be updated until converging. Accordingly, a circuit scale and an arithmetic operation amount may be saved. Hence, there is hardly a cost increase, and even if there is, an amount of the cost increase is slight.

Second Embodiment

Figure 8:
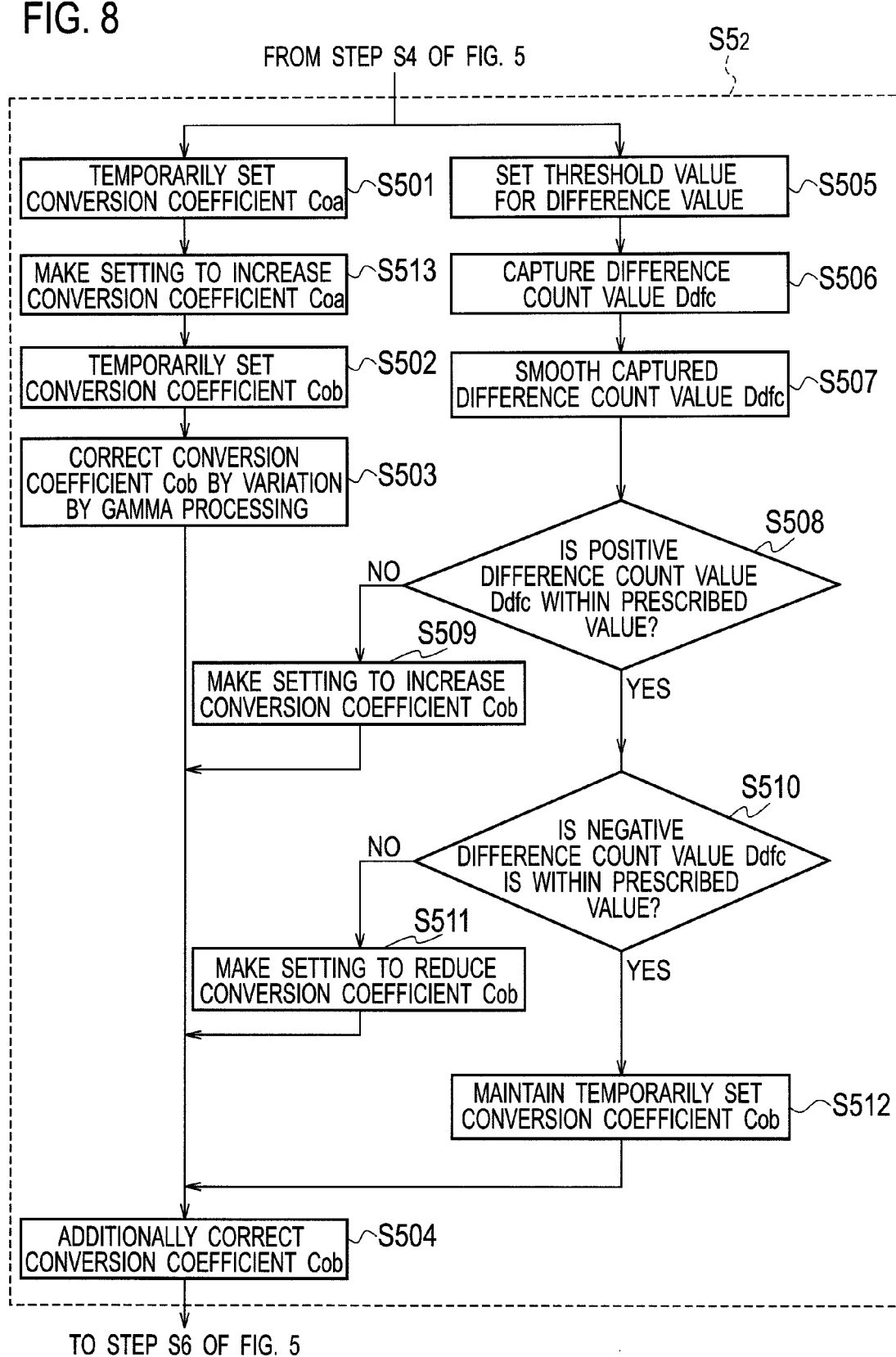
FIG. 8 is a flowchart of Step S5 in FIG. 5, showing specific processing of Step $S5_2$ according to a second embodiment.

A configuration of a second embodiment is similar to the configuration shown in FIG. 1. The second embodiment is an embodiment in which Step S5 in FIG. 5 is replaced by Step S$5_2$ shown in FIG. 8. In FIG. 8, the same reference numerals are assigned to the same portions as in FIG. 6, and a description thereof is omitted. As shown in FIG. 8, Sep S$5_2$ is a step in which Step S513 is provided between Step S501 and Step S502 in Step S$5_1$ shown in FIG. 6.

Depending on the exposure value ratio between the short-time exposure image data Da and the long-time exposure image data Db, the short-time exposure image data Da occupies a large amount of a region of the synthesis image. Then, a region occupied by the long-time exposure image data Db with less noise is reduced, and effects by the long-time exposure image data Db are not exerted sufficiently.

Accordingly, in Step S$5_2$ according to the second embodiment, in Step S513, the controller 11 makes a setting to increase the multiple of the conversion coefficient Coa, which is temporarily set at 64 times. For example, the controller 11 increases the conversion coefficient Coa so as to multiply, by 100 times, the short-time exposure image data Da. In this event, preferably, knee characteristics of the short-time exposure image data Da are changed in the input signal processor 2 so that the high brightness side of the short-time exposure image data Da cannot be saturated.

The conversion coefficient Coa is set to be increased, whereby a variation of the pixel value in the case of performing the gamma processing for the short-time exposure image data Da will differ in comparison with the case where Step S513 is not provided. Hence, the correction value of the conversion coefficient Cob is also set at an appropriate value in response to the setting to increase the conversion coefficient Coa.

In accordance with the second embodiment, the region in the synthesis image, which is occupied by the long-time exposure image data Db, can be increased, and a synthesis image with less noise can be obtained.

Third Embodiment

Figure 9:
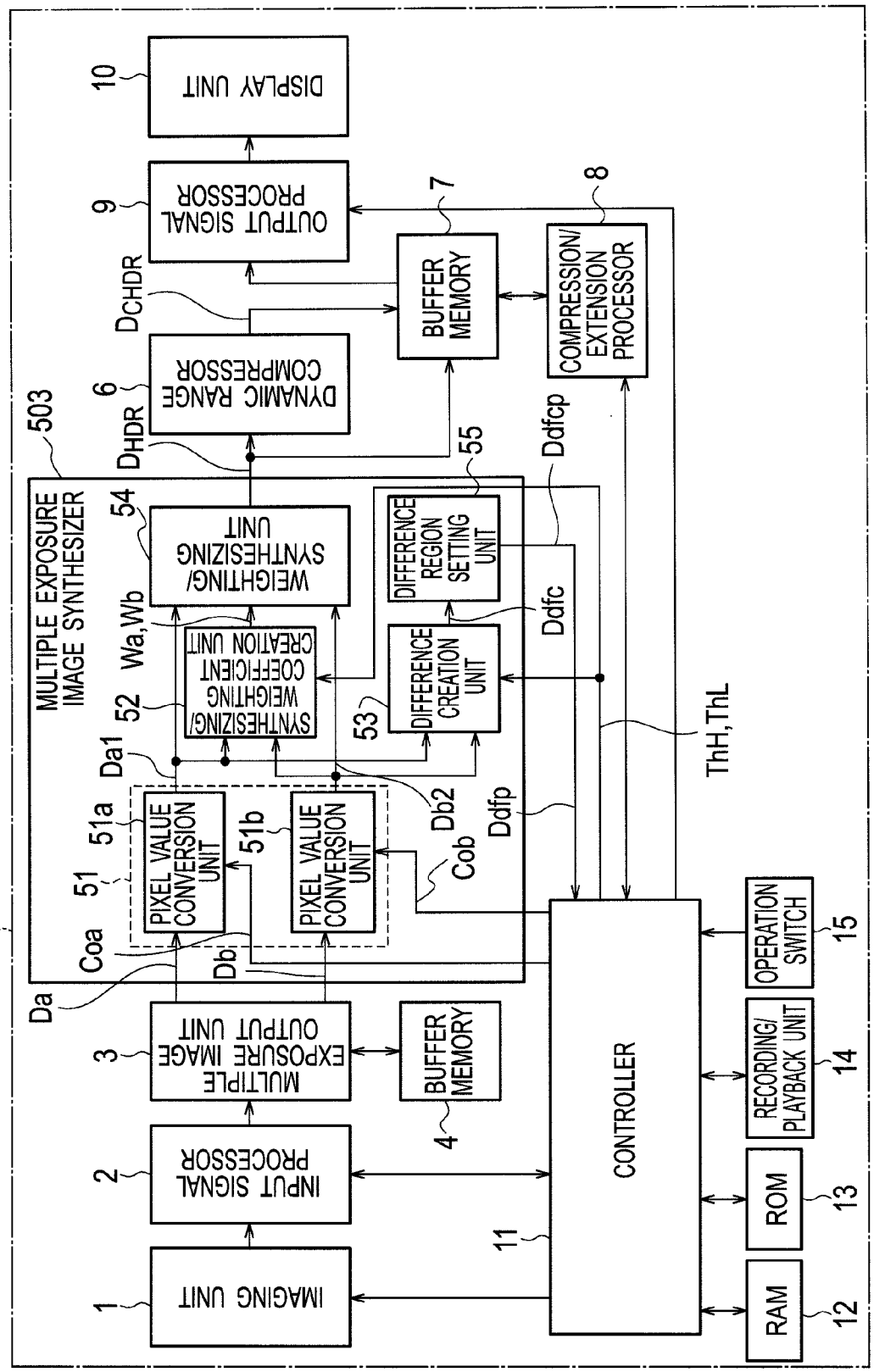
FIG. 9 is a block diagram showing a third embodiment.
Figure 10:
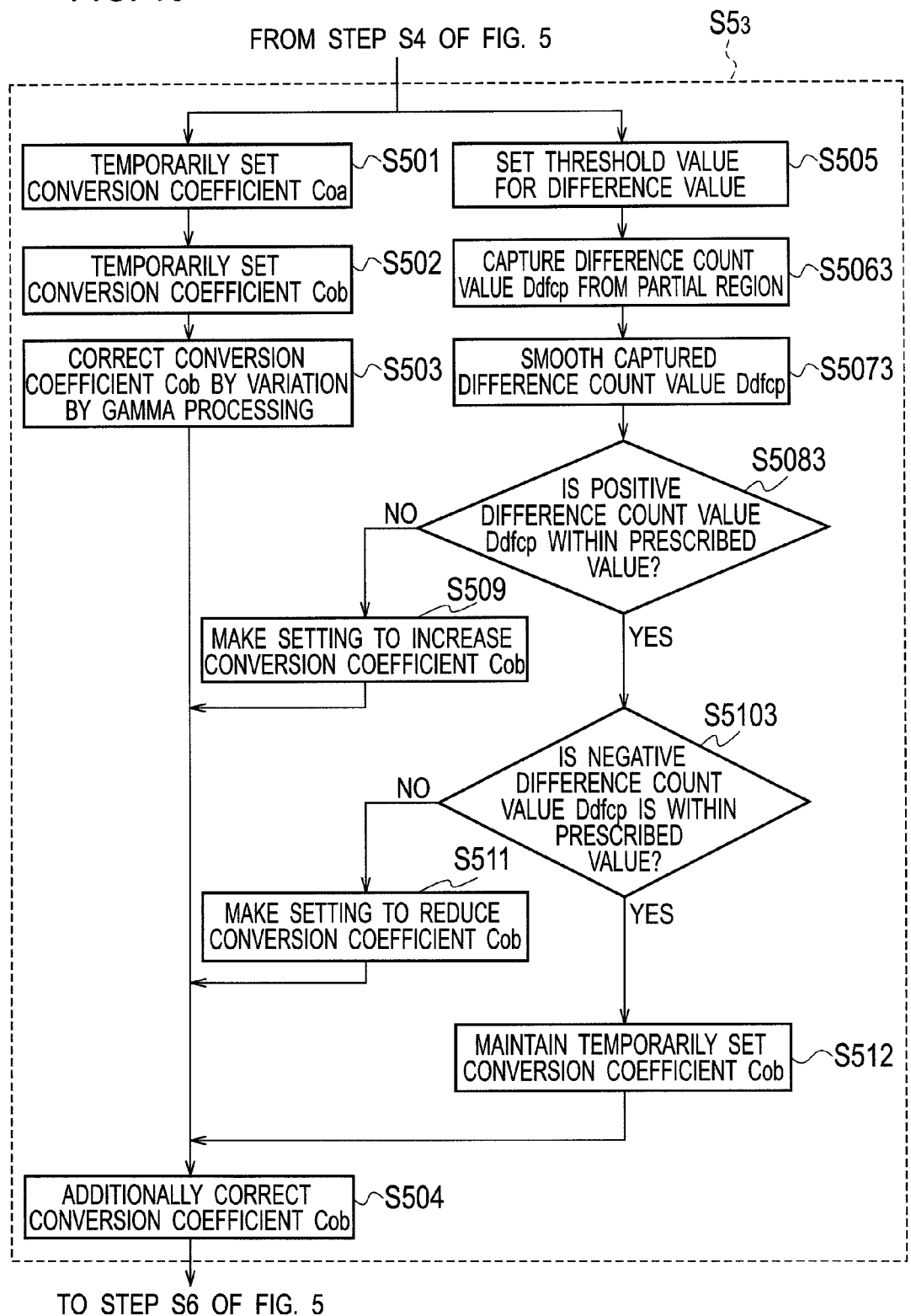
FIG. 10 is a flowchart of Step S5 in FIG. 5, showing specific processing of Step $S5_3$ according to the third embodiment.

By using FIG. 9 and FIG. 10, a description is made of a configuration and operation of a third embodiment. The third embodiment is an embodiment in which Step S5 in FIG. 5 is replaced by Step S5₃ shown in FIG. 10. In FIG. 9, the same reference numerals are assigned to the same portions as in FIG. 1, and in FIG. 10, the same reference numerals are assigned to the same steps as in FIG. 6, and descriptions thereof are individually omitted as appropriate.

In FIG. 9, a video camera 103 provides therein a multiple exposure image synthesizer 503 in place of the multiple image synthesizer 501 in FIG. 1. The multiple image synthesizer 503 includes a difference region setting unit 55 that outputs a difference count value Ddfcp of an inside of a partial specific region in the difference count value Ddfc in the whole of the screen (frame), which is outputted from the difference creation unit 53. Also here, for the sake of convenience, a difference count value Ddfcp that exceeds the positive threshold value will be referred to as a difference count value Ddfcp(+), and a difference count value Ddfcp that exceeds the negative threshold value will be referred to as a difference count value Ddfcp(−).

The specific region in the screen is, for example, a center portion of the screen. A user may designate the specific region by the operation switch 15. Moreover, a region of a face detected by a face detector (not shown) may be defined as the specific region.

In the third embodiment, as shown in FIG. 10, in Step S5063 after Step S505, the controller 11 captures the difference count value Ddfcp from the partial region, which is outputted from the difference region setting unit 55. In Step S5073, the control unit 11 smoothes the difference count value Ddfcp. In Step S5083, the controller 11 determines whether or not the positive difference count value Ddfcp(+) is within a prescribed value preset in the controller 11. If it is not determined that the difference count value Ddfcp(+) is within the prescribed value (NO), then in Step S510, the controller 11 makes a setting to increase the conversion coefficient Cob.

In Step S5103, the controller 11 determines whether or not the negative difference count value Ddfcp(−) is within a prescribed value preset in the controller 11. If it is not determined that the difference count value Ddfcp(−) is within the prescribed value (NO), then in Step S511, the controller makes a setting to reduce the conversion coefficient Cob. In Step S5063, the difference count value Ddfcp is captured from the partial region in Step S5063, and accordingly, it is necessary to differentiate the prescribed values for use in Steps S5083 and S5103 of FIG. 10 from the prescribed values for use in Steps S508 and S510 of FIG. 6.

In accordance with the third embodiment, based on the difference count value Ddfcp from the partial region, it is determined whether or not the pixel values of the short-time exposure image data Da1 and the long-time exposure image data Db2 come close to each other in the synthesis region. Accordingly, the data volume can be reduced, and a time until the various parameters for the synthesis converge can also be shortened. In place of the difference count value Ddfc of the whole of the screen, the difference count value Ddfcp from the partial region is used, and accordingly, the first embodiment is superior in the accuracy of continuing the pixel values at the boundary portions. However, the region of the center portion or the face, to which the user pays attention in the screen, is defined as the specific region, whereby the difference in accuracy is not substantially regarded as a problem.

Also in the third embodiment, Step S513 in FIG. 8 of the second embodiment may be provided between Step S501 and Step S502 of FIG. 10.

Fourth Embodiment

Figure 11:
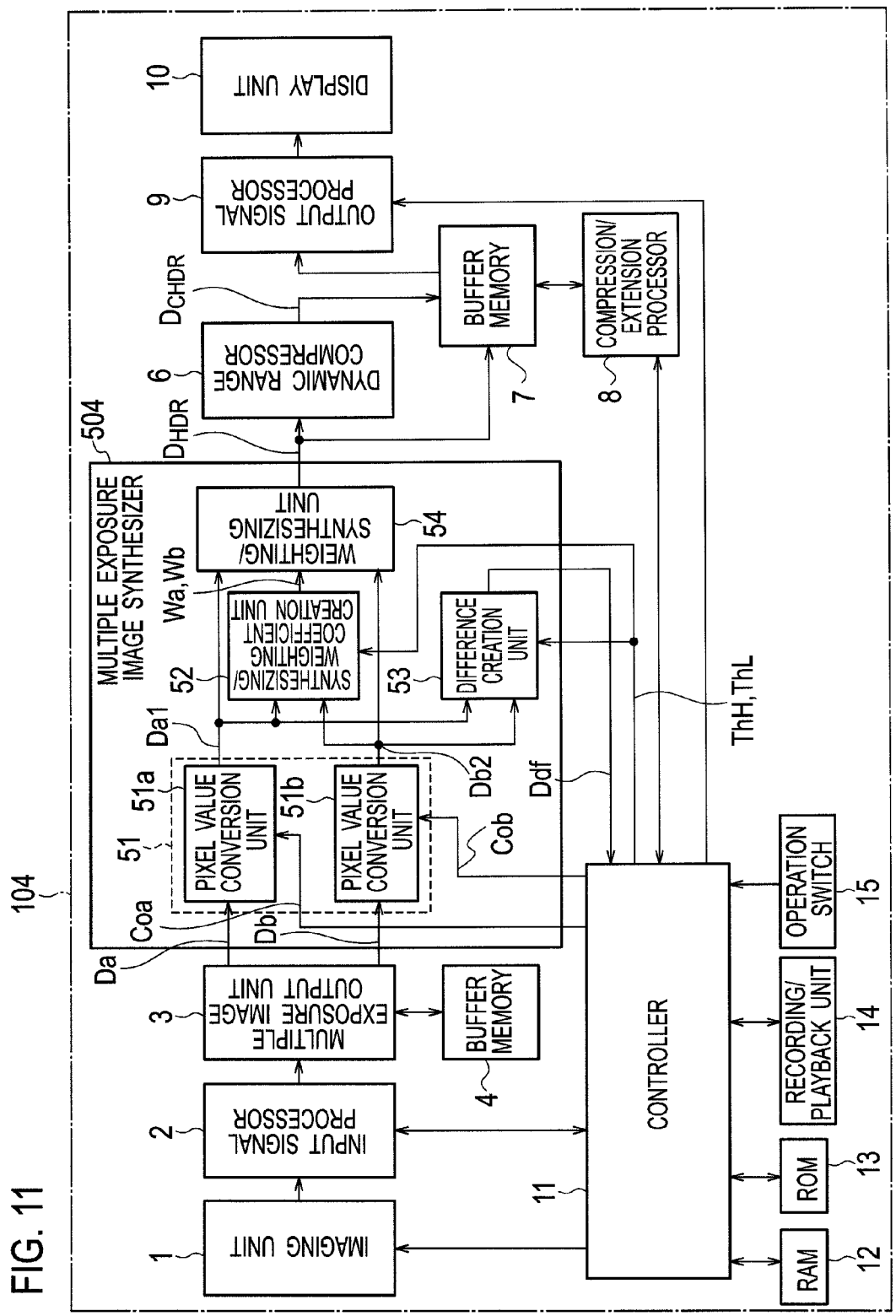
FIG. 11 is a block diagram showing a fourth embodiment.
Figure 12:
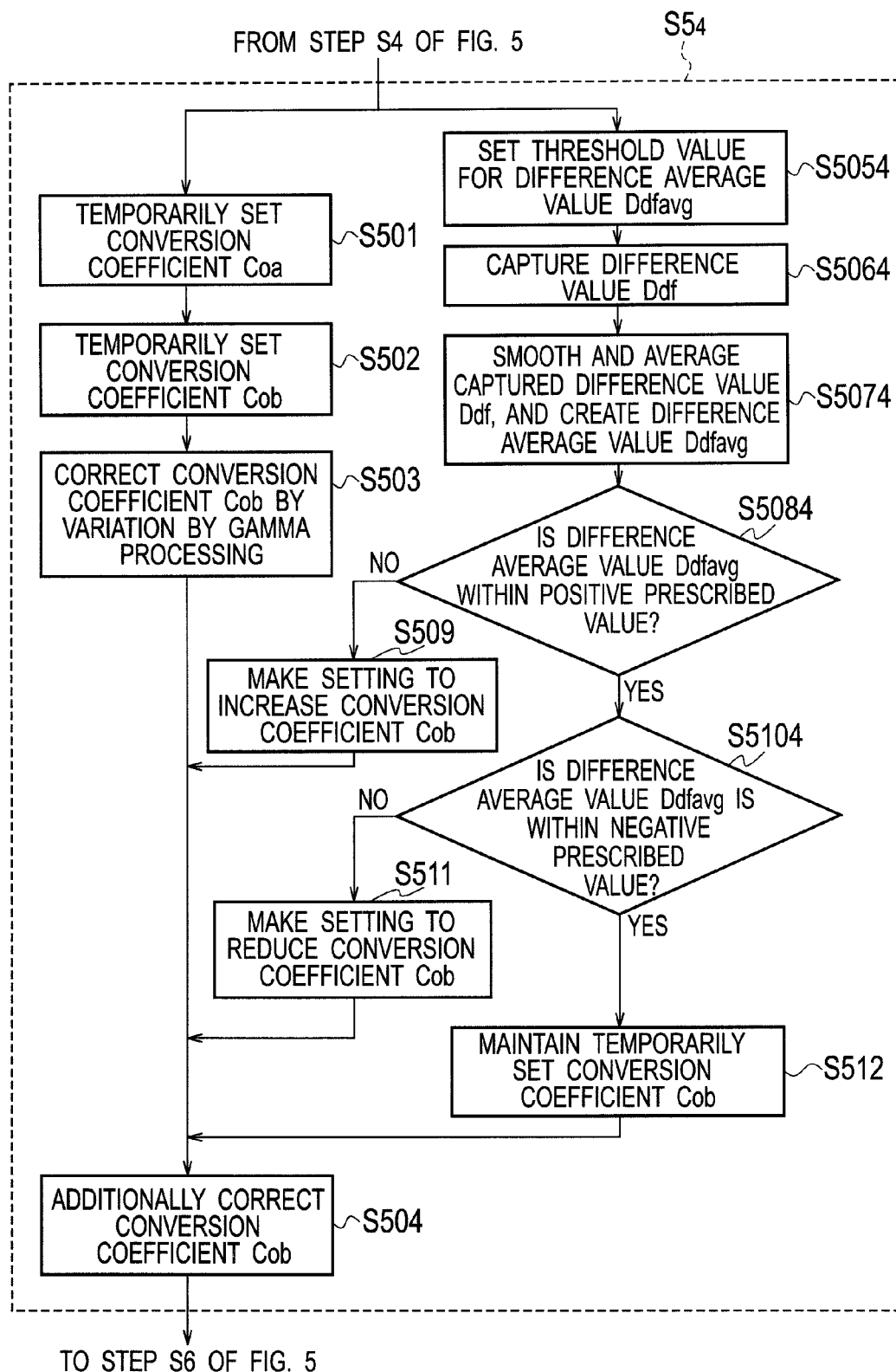
FIG. 12 is a flowchart of Step S5 in FIG. 5, showing specific processing of Step $S5_4$ according to the fourth embodiment.

By using FIG. 11 and FIG. 12, a description is made of a configuration and operation of a fourth embodiment. The fourth embodiment is an embodiment in which Step S5 in FIG. 5 is replaced by Step S5₄ shown in FIG. 12. In FIG. 11, the same reference numerals are assigned to the same portions as in FIG. 1, and in FIG. 12, the same reference numerals are assigned to the same steps as in FIG. 6, and descriptions thereof are individually omitted as appropriate.

In FIG. 11, a video camera 104 provides therein a multiple exposure image synthesizer 504 in place of the multiple image synthesizer 501 in FIG. 1. The multiple exposure image synthesizer 504 is configured so that the difference creation unit 53 cannot output the difference count value Ddfc but output the difference values Ddf themselves. In the fourth embodiment, the controller 11 directly evaluates a representative value that is based on the difference values Ddf.

In FIG. 12, in Step S5054, the controller 11 sets a threshold value for a difference average value to be described later. The threshold value to be set here is a value for preventing the conversion coefficient Cob from being increased and reduced in the case where the difference average value Ddfavg is the threshold value or less so that the conversion coefficient Cob cannot follow variations of the difference average value Ddfavg to an excessive degree.

In Step S5064, the controller 11 captures the difference values Ddf. In Step S5074, the controller 11 smoothes and averages the difference values Ddf, and creates the difference average value Ddfavg. The controller 11 defines the difference average value Ddfavg as the representative value for the evaluation of the difference values Ddf. A difference additional value, which is obtained by summing up the difference values Ddf in place of averaging the difference values Ddf, may be defined as the representative value.

In FIG. 12, in Step S5084, the controller 11 determines whether or not the difference average value Ddfavg is within a positive prescribed value preset in the controller 11. If it is not determined that the difference average value Ddfavg is within the prescribed value (NO), then in Step S509, the controller 11 makes a setting to increase the conversion coefficient Cob. In Step S5104, the controller 11 determines whether or not the difference average value Ddfavg is within a prescribed value preset in the controller 11. If it is not determined that the difference average value Ddfavg is within the negative prescribed value (NO), then in Step S511, the controller 11 makes a setting to reduce the conversion coefficient Cob.

As described above, also by evaluating the difference average value Ddfavg obtained from the difference values Ddf themselves in place of the difference count value Ddfc of the difference values which exceed the threshold value, similar effects to those of the first embodiment can be exerted. Note that, since the difference count value Ddfc is not used in the fourth embodiment, Step S705 may be set as a step of determining whether or not the difference average value Ddfavg is stable.

Also in the fourth embodiment, Step S513 in FIG. 8 of the second embodiment may be provided between Step S501 and Step S502 of FIG. 11.

Fifth Embodiment

Figure 13:
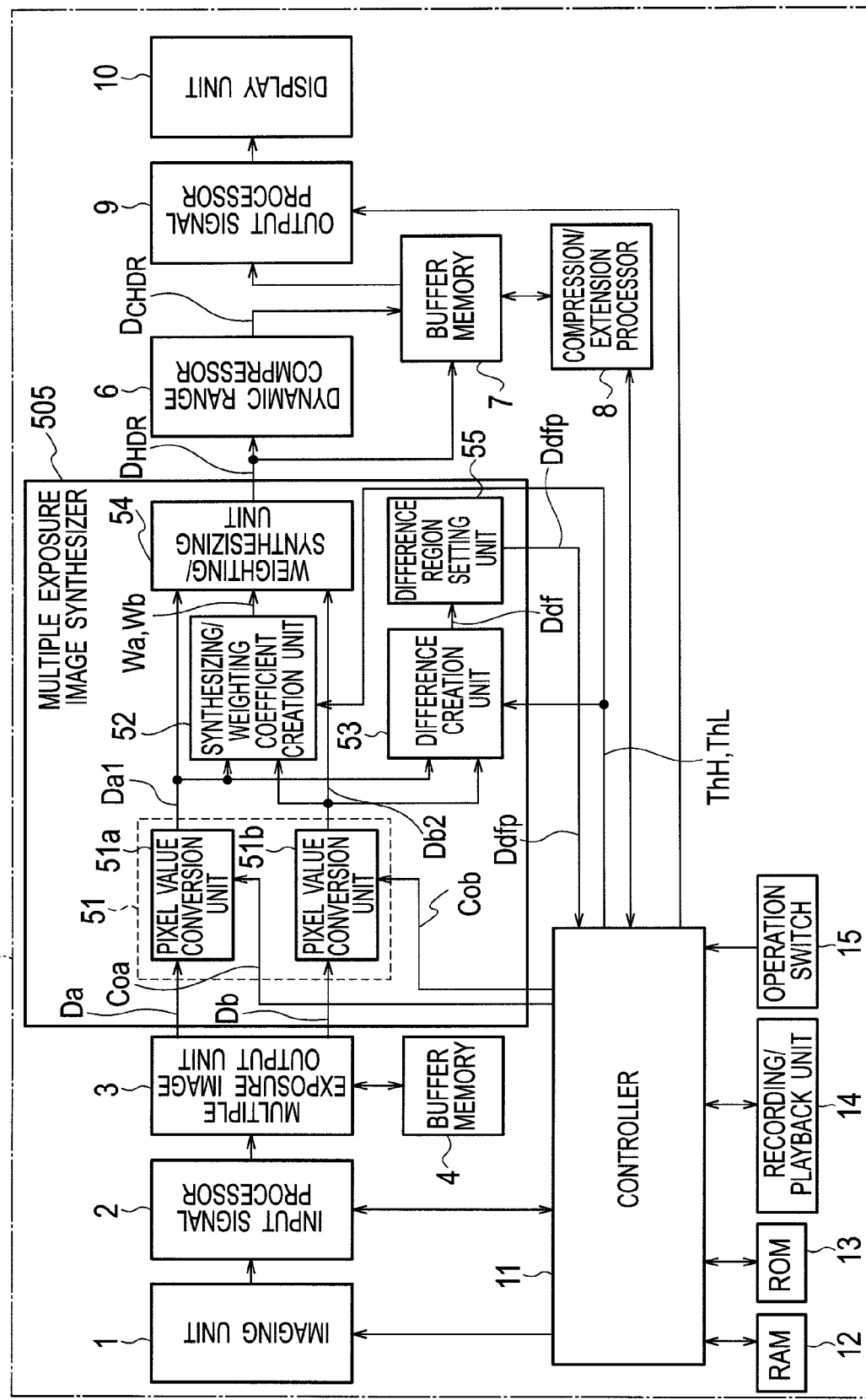
FIG. 13 is a block diagram showing a fifth embodiment.
Figure 14:
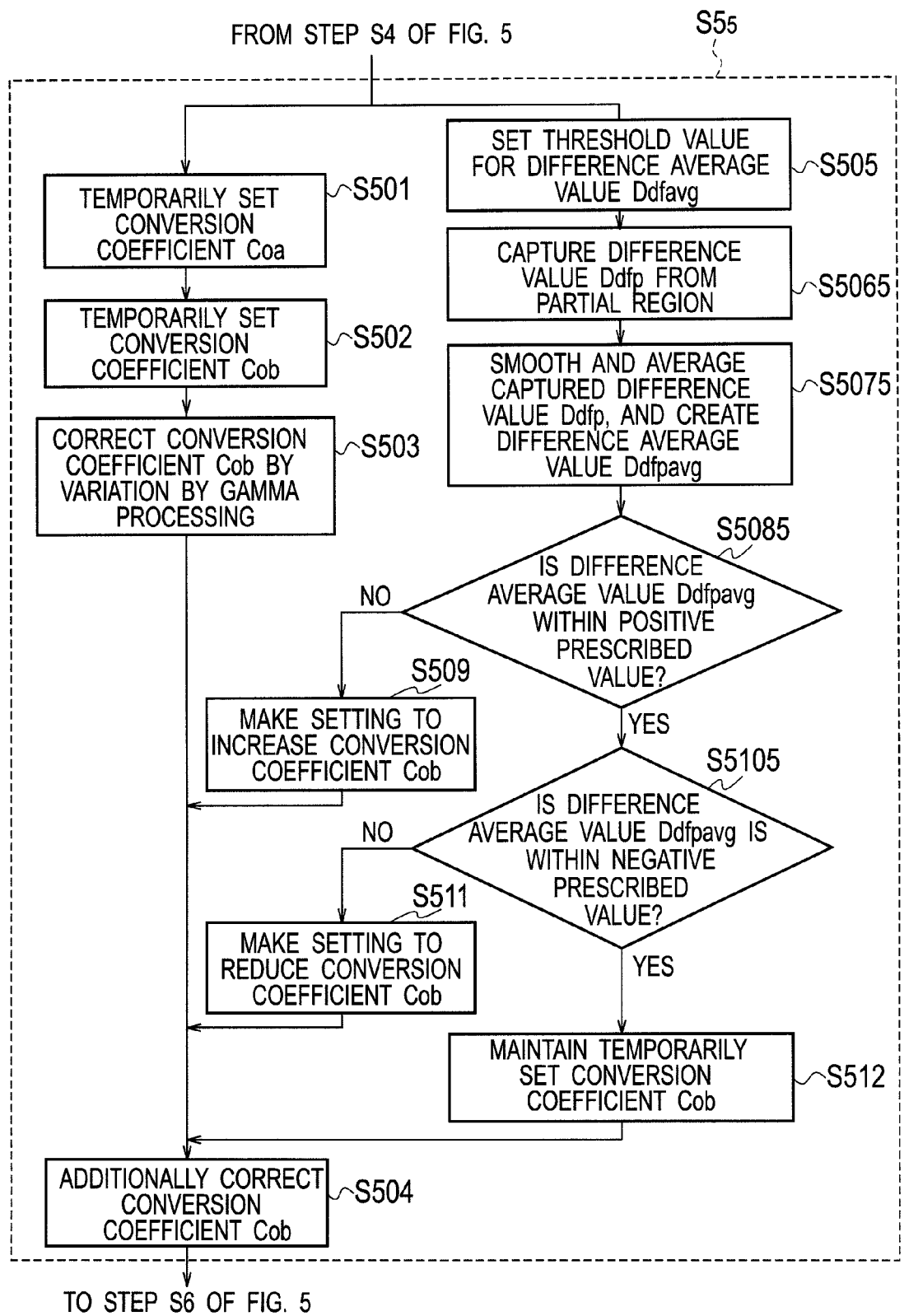
FIG. 14 is a flowchart of Step S5 in FIG. 5, showing specific processing of Step $S5_5$ according to the fifth embodiment.

By using FIG. 13 and FIG. 14, a description is made of a configuration and operation of a fifth embodiment. The fifth embodiment is an embodiment in which Step S5 in FIG. 5 is replaced by Step S5₅ shown in FIG. 14. In FIG. 13, the same reference numerals are assigned to the same portions as in FIG. 1, and in FIG. 14, the same reference numerals are assigned to the same steps as in FIG. 6, and descriptions thereof are individually omitted as appropriate.

In FIG. 13, a video camera 105 provides therein a multiple exposure image synthesizer 505 in place of the multiple image synthesizer 501 in FIG. 1. The multiple exposure image synthesizer 505 is configured so that the difference creation unit 53 can output the difference values Ddf, and that the difference region setting unit 55 can output difference values Ddfp of the inside of the partial specific region in the difference values Ddf in the whole of the screen (frame).

In FIG. 14, in Step S5055, the controller 11 sets a threshold value for a difference average value Ddfpavg to be described later. The threshold value for the difference average value Ddfpavg is similar to the threshold value for the difference average value Ddfavg in the fourth embodiment. In Step S5065, the controller 11 captures the partial difference values Ddfp. In Step S5075, the controller 11 smoothes and averages the partial difference values Ddfp, and creates the difference average value Ddfpavg.

In Step S5085, the control unit 11 determines whether or not the difference average value Ddfpavg is within a positive prescribed value preset in the controller 11. If it is not determined that the difference average value Ddfpavg is within the prescribed value (NO), then in Step S509, the controller 11 makes a setting to increase the conversion coefficient Cob. In Step S5105, the controller 11 determines whether or not the difference average value Ddfpavg is within a negative prescribed value preset in the controller 11. If it is not determined that the difference average value Ddfpavg is within the prescribed value (NO), then in Step S511, the controller 11 makes a setting to reduce the conversion coefficient Cob.

In the case of evaluating the difference values Ddf themselves in place of evaluating the difference count value Ddfc that exceeds the threshold value, preferably, the difference average value Ddfpavg from the partial region is used since the data volume can be reduced.

Also in the fifth embodiment, Step S513 in FIG. 8 of the second embodiment may be provided between Step S501 and Step S502 of FIG. 12.

Sixth Embodiment

Figure 15:
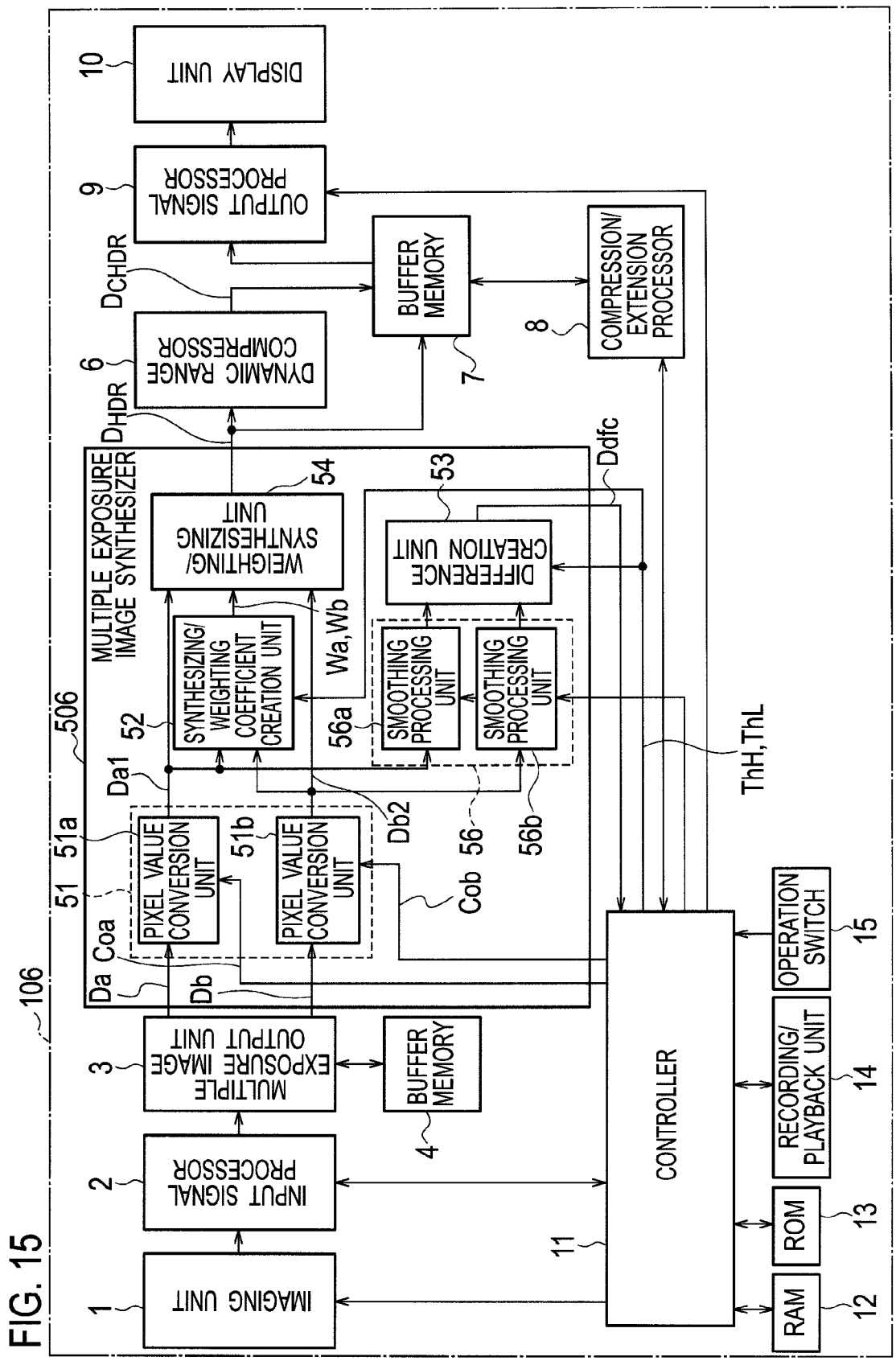
FIG. 15 is a block diagram showing a sixth embodiment.
Figure 16:
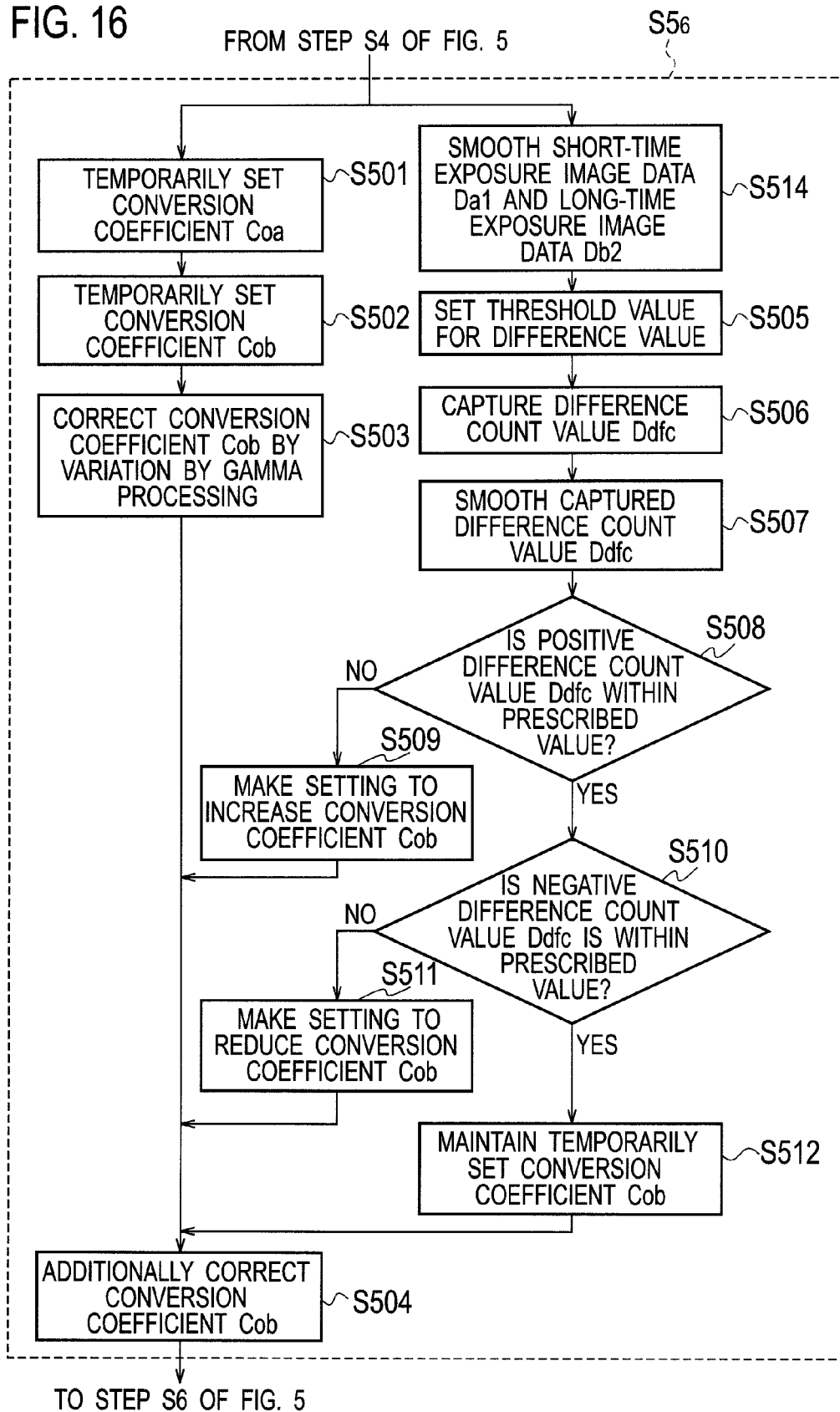
FIG. 16 is a flowchart of Step S5 in FIG. 5, showing specific processing of Step $S5_6$ according to the sixth embodiment.

By using FIG. 15 and FIG. 16, a description is made of a configuration and operation of a sixth embodiment. The sixth embodiment is an embodiment in which Step S5 in FIG. 5 is replaced by Step S5$_6$ shown in FIG. 16. In FIG. 15, the same reference numerals are assigned to the same portions as in FIG. 1, and in FIG. 16, the same reference numerals are assigned to the same steps as in FIG. 6, and descriptions thereof are individually omitted as appropriate. In FIG. 16, a video camera 106 provides therein a multiple exposure image synthesizer 506 in place of the multiple image synthesizer 501 in FIG. 1.

The multiple exposure image synthesizer 506 includes a smoothing processor 56. The smoothing processor includes: a smoothing processing unit 56a that smoothes the short-time exposure image data Da1 outputted from the pixel value conversion unit 51a; and a smoothing processing unit 56b that smoothes the long-time exposure image data Db2 outputted from the pixel value conversion unit 51b.

The smoothing processing units 56a and 56b can be composed of low-pass filters which smooth the pixel values in the screen. The short-time exposure image data Da1 and the long-time exposure image data Db2 are smoothed by the smoothing processing units 56a and 56b, whereby an influence can be reduced, which is given by the motion of the subject and the noise, the motion and the noise being other than the screen shaking removed by the multiple exposure output unit 3, to the difference values between the short-time exposure image data Da1 and the long-time exposure image data Db2.

The short-time exposure image data Da1 and the long-time exposure image data Db2, which are subjected to the smoothing processing and are outputted from the smoothing processing units 56a and 56b, are inputted to the difference creator 53. The difference creator 53 creates the difference count value Ddfc based on the short-time exposure image data Da1 and the long-time exposure image data Db2, which are subjected to the smoothing processing.

The low brightness portion of the short-time exposure image data Da1 has characteristics that S/N thereof is not good, and that a tone thereof is lowered. Accordingly, preferably, a smoothing coefficient of the filter for the short-time exposure image data Da1 in the smoothing processing unit 56a is made larger than a smoothing coefficient of the filter for the long-time exposure image data Db2 in the smoothing processing unit 56b. That is to say, preferably, a smoothing degree for the short-time exposure image data Da1 is made larger than a smoothing degree for the long-time exposure image data Db2.

In FIG. 16, in Step S514, the controller 11 smoothes the short-time exposure image data Da1 and the long-time exposure image data Db2 by the smoothing processing units 56a and 56b. The difference count value Ddfc captured in Step S506 is a value created based on the difference values in which the influence by the motion of the subject and the noise is reduced by the smoothing by the smoothing processing units 56a and 56b. Step S505, which is subsequent to Step S514, and after are similar to those of the first embodiment.

Also in the sixth embodiment, Step S513 in FIG. 8 of the second embodiment may be provided between Step S501 and Step S502 of FIG. 14. Moreover, also in the sixth embodiment, in a similar way to the fourth embodiment, the difference average value Ddfavg created based on the difference values Ddf may be evaluated in place of the difference count value Ddfc of the difference values which exceed the threshold value.

Seventh Embodiment

Figure 17:
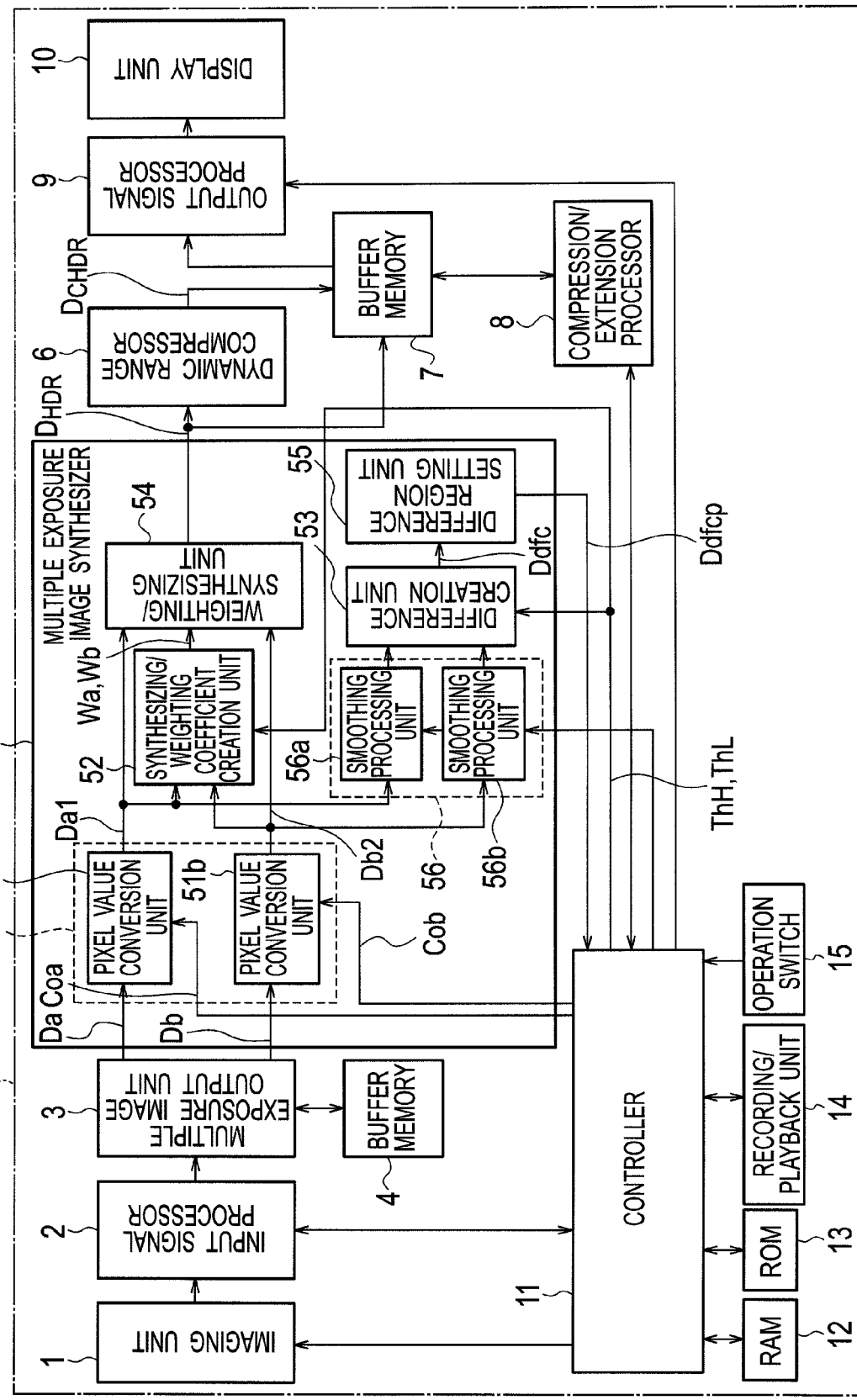
FIG. 17 is a block diagram showing a seventh embodiment.
Figure 18:
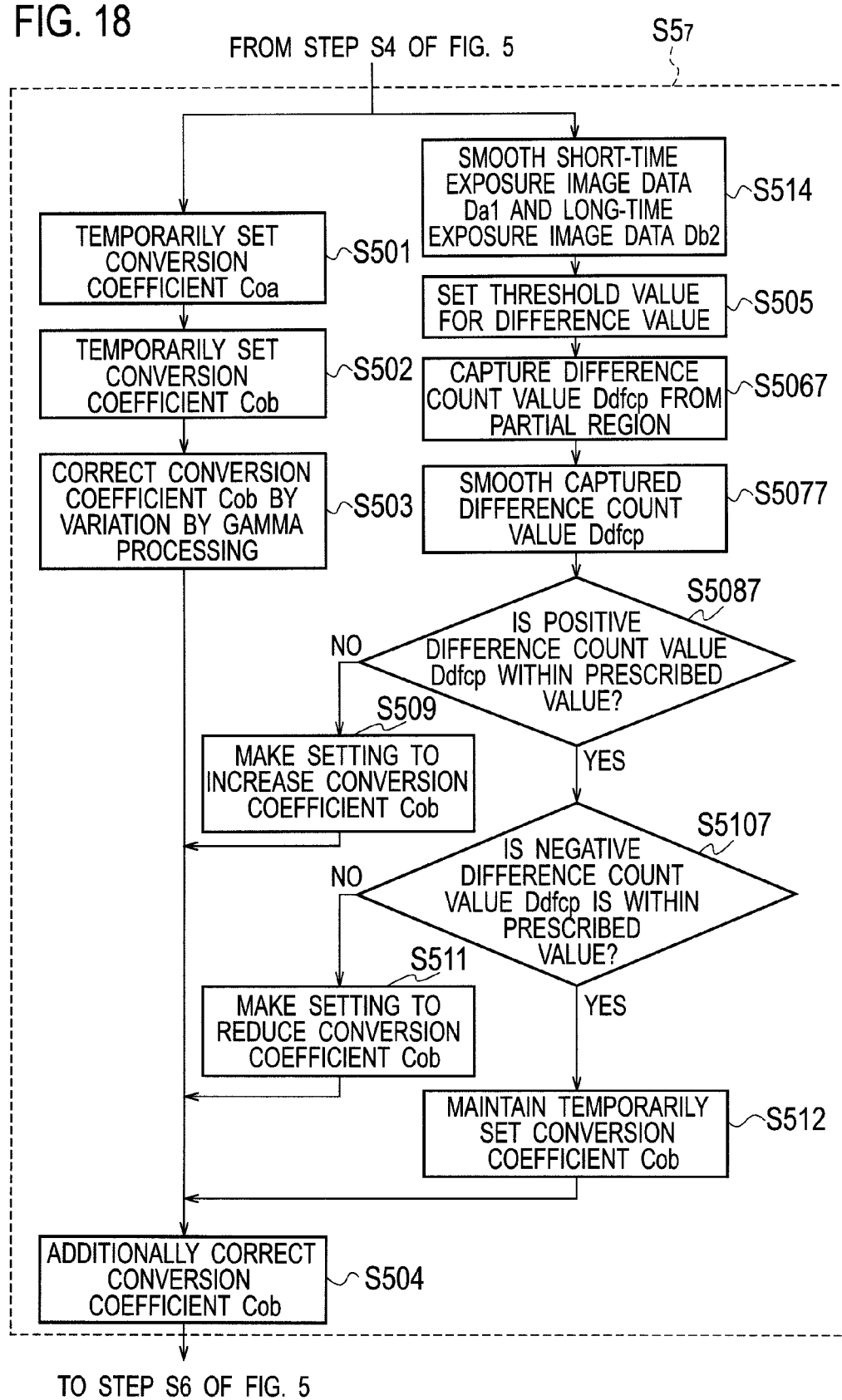
FIG. 18 is a flowchart of Step S5 in FIG. 5, showing specific processing of Step $S5_7$ according to the seventh embodiment.

By using FIG. 17 and FIG. 18, a description is made of a configuration and operation of a seventh embodiment. The seventh embodiment is an embodiment in which Step S5 in FIG. 5 is replaced by Step S5$_7$ shown in FIG. 18. In FIG. 17, the same reference numerals are assigned to the same portions as in FIG. 9 and FIG. 15, and in FIG. 18, the same reference numerals are assigned to the same steps as in FIG. 16, and descriptions thereof are individually omitted as appropriate.

In FIG. 17, a video camera 107 provides therein a multiple exposure image synthesizer 507 in place of the multiple image synthesizer 5013 in FIG. 9. The multiple exposure image sensor 507 includes: the smoothing processor 56 and the difference region setting unit 55.

The seventh embodiment has a configuration, in which the difference creator 53 creates the difference count value Ddfc based on the short-time exposure image data Da1 and the long-time exposure image data Db2, which are subjected to the smoothing processing by the smoothing processing units 56a and 56b, and the difference region setting unit 55 creates the difference count value Ddfcp from the partial region based on the difference count value Ddfc.

In FIG. 18, in Step S5067, the controller 11 captures the difference count value Ddfcp from the partial region, which is outputted from the difference region setting unit 55. In Step S5077, the controller 11 smoothes the difference count value Ddfcp. In Step S5087, the controller 11 determines whether or not the positive difference count value Ddfcp (+) is within the prescribed value preset in the controller 11. If it is not determined that the positive difference count value Ddfcp (+) is within the prescribed value (NO), then in Step S510, the controller 11 makes a setting to increase the conversion coefficient Cob.

In Step S5107, the controller 11 determines whether or not the negative difference count value Ddfcp (−) is within the prescribed value preset in the controller 11. If it is not determined that the negative difference count value Ddfcp (−) is within the prescribed value (NO), then in Step S511, the controller 11 makes a setting to reduce the conversion coefficient Cob.

Also in the seventh embodiment, Step S513 in FIG. 8 of the second embodiment may be provided between Step S501 and Step S502 of FIG. 16. Moreover, also in the seventh embodiment, in a similar way to the fifth embodiment, the difference average value Ddfavg created from the partial region may be evaluated in place of the difference count value Ddfcp from the partial region.

As described above, in accordance with the image processing apparatus and image processing method of each of the embodiments, the pixel values at the boundary portions in the event of synthesizing the images of the plurality of frames can be continued without increasing the circuit scale and the arithmetic operation amount to a large extent, and it becomes possible to create the visually natural image with the wide dynamic range.

The present invention is not limited to each of the embodiments described above, and is changeable in various ways within the scope without departing from the spirit of the present invention. As each of the embodiments, the example where the image processing apparatus is mounted on the video camera is shown; however, the present invention can be applied to an image display apparatus and an information processing apparatus such as a computer.

In each of the embodiments, the imaged images are synthesized instantaneously, and the synthesis image is created; however, the image processing apparatus of the present invention may be an image processing apparatus that stores and accumulates, in a storage medium, the images imaged while differentiating the exposure value, and synthesizes the images accumulated in the storage medium. In each of the embodiments, the image synthesis is performed in a mode of the brightness signal Y and the color difference signals Cb and Cr; however, it is also possible to perform the image synthesis by the RGB signals.

In each of the embodiments, the description has been made of the synthesis of the moving pictures; however, the present invention may be applied to synthesis of still images. In the case of synthesizing two still images imaged while differentiating the exposure value, the update processing for the variety of parameters just need to be repeated until an optimum synthesis image is obtained as a result of repeatedly updating the parameters for the same image.

In each of the embodiments, the compressed wide dynamic range image data $D_{CHDR}$ is displayed on the display unit 10, or the encoded data that is based on the compressed wide dynamic range image data $D_{CHDR}$ is recorded in the recording/playback unit 14; however, the wide dynamic range image data $D_{HDR}$ may be recorded or displayed as it is. As mentioned above, three or more images different in the exposure value may be synthesized.

Moreover, in each of the embodiments, the controller 11 is operated as the parameter update unit; however, a controller, which sets or updates the conversion coefficient Coa and Cob, and a controller, which sets or updates the upper limit value ThH and the lower limit value ThL, may be provided separately from each other, and a specific way of the configuration is arbitrary.

Incidentally, in each of the embodiments, the digital signals in the multiple exposure image output unit 3 and after are referred to as the data for the sake of convenience; however, the signals include both of analog signals and the digital signals without distinguishing both thereof. In each of the embodiments, it is defined that the digital signal processing is performed in the multiple exposure image output unit 3 and after; however, the way of selecting the digital signal processing and the analog signal processing is also arbitrary.

What is claimed is:

1. An image processing apparatus comprising:
a pixel value converter configured to receive a first plurality of image signals obtained by imaging a same subject a plurality of times while mutually differentiating an exposure value, to convert a pixel value of at least one image signal of the first plurality of image signals based on a pixel value conversion coefficient so that a pixel value difference in the first plurality of image signals owing to a fact that there is a difference in the exposure value be matched, and to output the first plurality of image signals as a second plurality of image signals;
a synthesizing/weighting coefficient creation unit configured to create a synthesizing/weighting coefficient for use in an event of synthesizing the second plurality of image signals while taking, as a boundary portion, a region including a pixel with a predetermined pixel value;
a difference creation unit configured to create a difference between the second plurality of image signals;
a weighting/synthesizing unit configured to weight and synthesize the second plurality of image signals by using the synthesizing/weighting coefficient and to create a synthetic image signal; and
a parameter update unit configured to evaluate the difference created by the difference creation unit, and to update the pixel value conversion coefficient so that the difference becomes smaller.

2. The image processing apparatus according to claim 1, wherein the parameter update unit updates the synthesizing/weighting coefficient at a same time of updating the pixel value conversion coefficient.

3. The image processing apparatus according to claim 1, wherein, when the boundary portion is a region including pixels with a plurality of pixel values, a largest pixel value of the boundary portion is defined as an upper limit value, and a smallest pixel value of the boundary portion is defined as a lower limit value, then as a synthesizing/weighting coefficient for synthesizing two image signals in the second plurality of image signals, the synthesizing/weighting coefficient creation unit defines one image signal of the two image signals in a portion larger than the upper limit value, defines other image signal of the two image signals in a portion smaller than the lower limit value, and between the upper limit value and the lower limit value, creates a synthesizing/weighting coefficient for crossfading and mixing the two image signals.

4. The image processing apparatus according to claim 2, wherein, at the same time of updating the pixel value conversion coefficient, the parameter update unit updates the upper limit value and the lower limit value so that an interval therebetween be narrowed, and the synthesizing/weighting coefficient creation unit creates a synthesizing/weighting coefficient based on the updated upper limit value and lower limit value.

5. The image processing apparatus according to claim 3, wherein, when one image signal in the two image signals is taken as a reference, the difference creation unit creates a difference of other image signal therefrom under a condition where the one image signal taken as a reference is located between the upper limit value and the lower limit value.

6. The image processing apparatus according to claims 1, wherein the parameter updates unit evaluates a difference between the second plurality of image signals in a partial region in each frame.

7. The image processing apparatus according to claim 1, further comprising:
   a smoothing processing unit configured to smooth the second plurality of image signals in each frame,
   wherein the difference creation unit creates a difference between the second plurality of image signals smoothed by the smoothing processing unit.

8. The image processing apparatus according to claim 7, wherein the smoothing processing unit increases a smoothing degree for the image signal with a small exposure value more than a smoothing degree for the image signal with a large exposure value among the second plurality of image signals.

9. An image processing method comprising:
   imaging a same subject a plurality of times while mutually differentiating an exposure value, and creating a first plurality of image signals;
   converting a pixel value of at least one image signal of the first plurality of image signals based on a pixel value conversion coefficient so that a pixel value difference in the first plurality of image signals owing to a fact that there is a difference in the exposure value be matched, and creating a second plurality of image signals;
   creating a synthesizing/weighting coefficient for use in an event of synthesizing the second plurality of image signals while taking, as a boundary portion, a region including a pixel with a predetermined pixel value;
   creating a difference between the second plurality of image signals;
   weighting and synthesizing the second plurality of image signals by using the synthesizing/weighting coefficient, and creating a synthetic image signal; and
   evaluating the difference, and updating the pixel value conversion coefficient so that the difference becomes smaller.

10. The image processing method according to claim 9, wherein the updating the pixel value conversion coefficient comprises updating the synthesizing/weighting coefficient at a same time of updating the pixel value conversion coefficient.

11. The image processing method according to claim 9, wherein, when the boundary portion is a region including pixels with a plurality of pixel values, a largest pixel value of the boundary portion is defined as an upper limit value, and a smallest pixel value of the boundary portion is defined as a lower limit value, then as a synthesizing/weighting coefficient for synthesizing two image signals in the second plurality of image signals, the creating the synthesizing/weighting coefficient defines one image signal of the two image signals in a portion larger than the upper limit value, defines other image signal of the two image signals in a portion smaller than the lower limit value, and between the upper limit value and the lower limit value, creates a synthesizing/weighting coefficient for crossfading and mixing the two image signals.

12. The image processing method according to claim 10,
   wherein, at the same time of updating the pixel value conversion coefficient, the updating the pixel value conversion coefficient comprises updating the upper limit value and the lower limit value so that an interval therebetween be narrowed, and
   the creating a synthesizing/weighting coefficient comprises creating a synthesizing/weighting coefficient based on the updated upper limit value and lower limit value.

13. The image processing method according to claim 11, wherein the creating a difference comprises creating, when one image signal in the two image signals is taken as a reference, a difference of other image signal therefrom under a condition where the one image signal taken as a reference is located between the upper limit value and the lower limit value.

14. The image processing method according to claim 9, wherein the updating the pixel value conversion coefficient comprises evaluating a difference between the second plurality of image signals in a partial region in a frame.

15. The image processing method according to claim 9, further comprising:
   smoothing the second plurality of image signals in each frame,
   wherein the creating a difference comprises creating a difference between the smoothed second plurality of image signals.

16. The image processing method according to claim 15, wherein the smoothing comprises increasing a smoothing degree for the image signal with a small exposure value more than a smoothing degree for the image signal with a large exposure value among the second plurality of image signals.

* * * * *